United States Patent
Ryu et al.

(10) Patent No.: US 7,986,633 B2
(45) Date of Patent: Jul. 26, 2011

(54) METHOD OF CONTROLLING DATA TRANSMISSION FOR MULTIMEDIA AND BROADCASTING SERVICES IN A BROADBAND WIRELESS ACCESS SYSTEM

(75) Inventors: Ki Seon Ryu, Seoul (KR); Yong Ho Kim, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 712 days.

(21) Appl. No.: 11/722,874

(22) PCT Filed: Aug. 26, 2005

(86) PCT No.: PCT/KR2005/002840
§ 371 (c)(1),
(2), (4) Date: May 7, 2008

(87) PCT Pub. No.: WO2006/070992
PCT Pub. Date: Jul. 6, 2006

(65) Prior Publication Data
US 2009/0080351 A1    Mar. 26, 2009

(30) Foreign Application Priority Data

Dec. 27, 2004  (KR) .................. 10-2004-0112928
Jan. 7, 2005   (KR) .................. 10-2005-0001774
Jan. 11, 2005  (KR) .................. 10-2005-0002667
Feb. 14, 2005  (KR) .................. 10-2005-0011995

(51) Int. Cl.
*H04L 12/28*  (2006.01)
*H04W 4/00*   (2009.01)
*H04J 3/16*   (2006.01)

(52) U.S. Cl. ............... 370/252; 370/338; 370/465
(58) Field of Classification Search ........... 370/328, 370/241; 455/442; 375/224
See application file for complete search history.

(56) References Cited

U.S. PATENT DOCUMENTS

| | | | |
|---|---|---|---|
| 6,701,129 B1 * | 3/2004 | Hashem et al. | 455/67.11 |
| 7,020,185 B1 * | 3/2006 | Balachandran et al. | 375/219 |
| 7,177,658 B2 * | 2/2007 | Willenegger et al. | 455/522 |
| 7,227,874 B2 * | 6/2007 | Kim et al. | 370/468 |
| 7,752,519 B2 | 7/2010 | Yeo et al. | |
| 7,768,966 B2 * | 8/2010 | Yoon et al. | 370/329 |
| 2002/0118666 A1 | 8/2002 | Stanwood et al. | |

(Continued)

FOREIGN PATENT DOCUMENTS

WO   2004064424   7/2004

OTHER PUBLICATIONS

IEEE Standards. '802.16: Air Interface for Fixed Broadband Wireless Access Systems;, IEEE, New York, NY, USA, Apr. 8, 2002.

*Primary Examiner* — Nittaya Juntima
(74) *Attorney, Agent, or Firm* — Lee, Hong, Degerman, Kang & Waimey

(57) ABSTRACT

The present invention relates to a method of controlling data transmission for a multimedia and broadcasting service in a broadband wireless access system. As an aspect of the present invention, a base station receives feedback information including burst profile information with which a terminal can receive MBS data without errors and the base station configures an appropriate burst profile and transmit the MBS data using the burst profile to the terminal, thereby reception errors in the terminal can be minimized and radio resources can be used efficiently.

22 Claims, 20 Drawing Sheets

U.S. PATENT DOCUMENTS

| | | |
|---|---|---|
| 2004/0151133 A1 | 8/2004 | Yi et al. |
| 2004/0224698 A1 | 11/2004 | Yi et al. |
| 2005/0041573 A1 | 2/2005 | Eom et al. |
| 2005/0107036 A1 | 5/2005 | Song et al. |
| 2005/0117539 A1 | 6/2005 | Song et al. |
| 2005/0129058 A1 | 6/2005 | Casaccia et al. |
| 2005/0159163 A1 | 7/2005 | Chang et al. |
| 2005/0249142 A1* | 11/2005 | Kim et al. .................... 370/312 |
| 2005/0259643 A1 | 11/2005 | Chuah et al. |
| 2006/0268882 A1 | 11/2006 | Mademann |
| 2009/0067374 A1 | 3/2009 | Yoon et al. |
| 2009/0175178 A1 | 7/2009 | Yoon et al. |

* cited by examiner

--Prior Art--

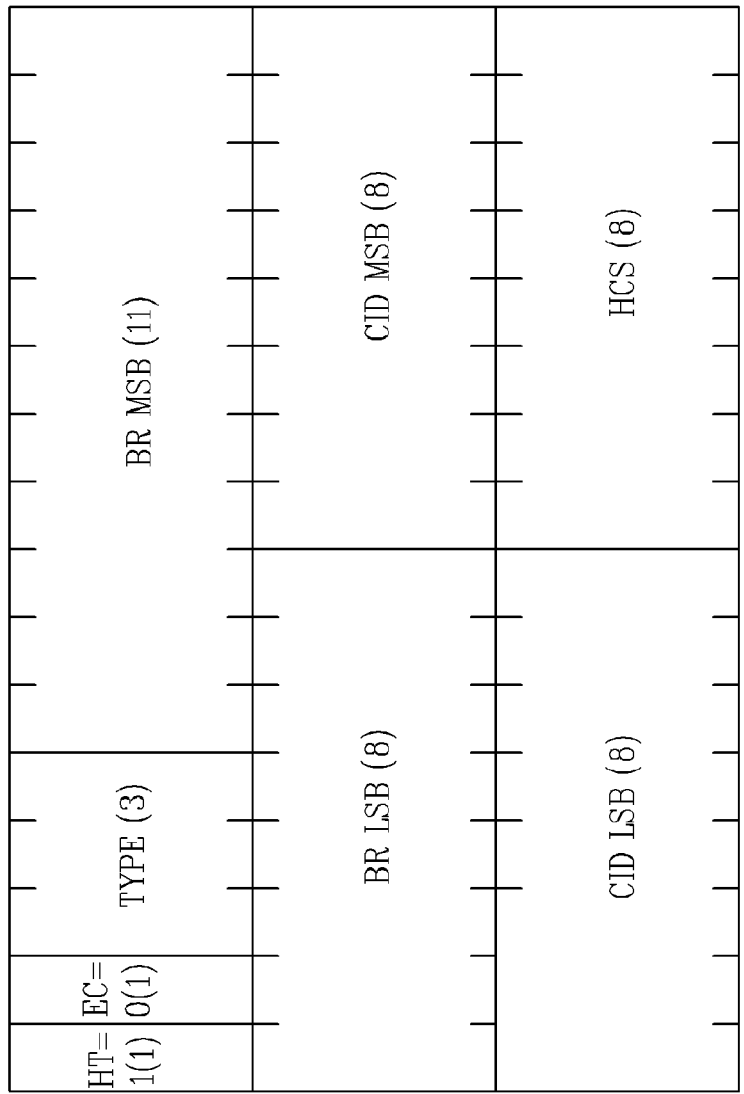

--Prior Art--

METHOD OF CONTROLLING DATA TRANSMISSION FOR MULTIMEDIA AND BROADCASTING SERVICES IN A BROADBAND WIRELESS ACCESS SYSTEM

CROSS-REFERENCE TO RELATED APPLICATIONS

This application is a 35 U.S.C. §371 filing of PCT Appln. No. PCT/KR/2005/002840, filed Aug. 26, 2005, which claims the benefit of earlier filing date and right of priority to Korean Application Nos. 10-2004-0112928, filed on Dec. 27, 2004, 10-2005-0001774, filed on Jan. 7, 2005, 10-2005-0002667, filed on Jan. 11, 2005 and 10-2005-0011995, filed on Feb. 14, 2005, the contents of all of which are incorporated by reference herein in their entirety.

TECHNICAL FIELD

The present invention relates to a broadband wireless access system, more particularly, relates to a method of controlling data transmission for a multicast and broadcast service (MBS), such that reception quality of MBS data can be ensured in a terminal.

BACKGROUND ART

A broadband wireless access system defines protocols between a medium access control (MAC) layer and a physical (PHY) layer for setting up a point-to-multipoint connection between a base station and a terminal. FIG. 1 illustrates a hierarchical protocol structure of a broadband wireless access system.

The physical layer of a broadband wireless access system may be broadly specified into a single carrier type and a multiple carrier type. An orthogonal frequency division multiplexing (OFDM) has mainly been used as the multiple carrier type and an orthogonal frequency division multiple access (OFDMA) in which communication resources can be allocated in a unit of a subchannel grouped by a part of carriers has been used as an access method.

Reed-Solomon (RS) code, convolution code or block turbo code can be selectively used for forward error correction (FEC) and BPSK, QPSK, 16-QAM or 64-QAM be used as a modulation scheme in a broadband wireless access system. An adaptive modulation/coding (AMC) scheme with which a modulation mode and code rate is dynamically selected according to channel state can also be used. Received signal strength indication (RSSI), carrier to interference and noise ratio (CINR) or bit error rate (BER), etc may be used in measuring channel quality for the AMC.

Active carriers are divided into a plurality of groups and each group is transmitted to a receiving side and each group is called a subchannel. Carriers belong to a subchannel can be adjacent each other or be separated with a same interval. Multiple access in a unit of a subchannel may increase complexity in implementation, but can increase frequency diversity gain and gain arising from power concentration, and can efficiently perform forward link power control.

Slots allocated to each user can be defined by 2-dimensional data region which is group of consecutive subchannels allocated by bursts. One data region in an OFDMA can be represented by a rectangular form determined with a time coordinate and a subchannel coordinate. The data region can be allocated to a user for uplink data transmission or can be used for transmitting data to a user in a forward link. The number of OFDM symbols in a time domain and the number of consecutive subchannels starting from a point separated a specific offset from a reference point in a frequency domain for defining such a data region in a 2-dimensional space.

MAC data is divided according to a FEC block size and each FEC block is expanded to occupy three OFDM symbols in a time axis of each subchannel. When the end of the data region is reached while continuing mapping in order with increasing the number of subchannel with respect to each FEC block, mapping is continued in a same manner from an OFDM symbol having a following number. FIG. 2 illustrates a procedure of mapping FEC blocks to OFDMA subchannels and OFDMA symbols.

FIG. 3 illustrates structure of a data frame in a physical channel in an OFDMA broadband wireless access system. A downlink sub-frame begins with a preamble used for synchronization and equalization. Structure of the entire frame is defined by broadcasting-based downlink DL-MAP messages and uplink UL-MAP messages defining locations and uses of bursts allocated to the downlink and uplink.

The DL-MAP and UL-MAP messages define the uses of data bursts allocated to the downlink and the uplink, respectively in a bust mode physical layer. Information elements (IEs) constituting a DL-MAP message divide downlink traffic duration by a downlink interval usage code (DIUC), a connection ID (CID), and location information of the bursts (subchannel offset, symbol offset, a number of subchannel or symbol, etc). Meanwhile, an uplink interval usage code (UIUC) defines a use of each information element constituting a UL-MAP message and 'duration' defines the location of the corresponding duration per each CID. In other words, the use of each duration is defined by the UIUC used in the UL-MAP and each duration begins from a point separated 'duration' defined in the UL-MAP IE from the start point of the former IE.

A DCD message and a UCD message include a modulation type, a FEC code type, etc which are parameters associated with the physical layer applied to burst duration allocated to the downlink and uplink, respectively. The DCD and UCD messages further include parameters necessary according to various FEC code types (e.g. K and R value of the RS code). Such parameters are given by burst profiles stipulated for each UIUC and DIUC in the UCD and DCD messages, respectively.

The MAC layer in the broadband wireless access system is basically based on the DOCSIS standard which is a cable modem standard of MCNS consortium. Core features of the MAC layer such as MAC management method and resource allocation method, etc are similar with those of the DOCSIS standard, except security guarantee according to characteristics of a wireless system, support for various type of modulation schemes, and partial addition and amendment.

A service-specific convergence sublayer (CS) is a layer above a MAC CPS (common part sublayer) and performs functions of reception, classification, and process of protocol data units (PDUs) received from an upper layer, and transfer of CS PDU to an appropriate MAC SAP, and reception of CS PDUs from a peer entity. Further, the CS classifies upper layer PDUs for each connection and optionally provides the functions of compressing payload header information or restoring compressed header information.

The MAC CPS performs mapping of each packet to an appropriate connection-based service flow during packet transmission between a terminal and a base station and provides different levels of quality of service (QoS) according to the connection-based service flow. The formats of MAC PDUs defined by the MAC CPS are described below.

FIG. 4A illustrates a format of a MAC PDU. The MAC PDU can be classified into a MAC management PDU and a user data MAC PDU. The MAC management PDU comprises a payload part including MAC management messages predetermined for actions of the MAC layer and a header part located before the payload part. A band request PDU is a special type of MAC management PDU including a header called a band request header without the payload part. The band request header is made to be transmitted through contention-based uplink band so that it may be used for requesting uplink band by a terminal which has not been allocated with uplink band from a base station. FIG. 4B illustrates an example of the band request header.

A packet PDU corresponding user data is mapped to the payload part of a MAC SDU and a MAC header and cyclic redundancy check (CRC) bits (optional) are attached to the packet PDU to be a MAC PDU. FIG. 4C illustrates an example of an uplink burst including a plurality of consecutive MAC PDUs. Each MAC PDU is identified by an original connection ID (CID) and MAC management messages, band request PDU, etc as well as user PDU can be included in a same burst.

A MAC management message comprises a field representing a type of the management message and a payload part. A DCD, UCD, UL-MAP, and DL-MAP are representative examples of the management message, as described above, defining parameters of a frame structure, band allocation, and physical layer.

A scheduling service is adopted for increasing efficiency of a polling/transmission admission procedure. A base station may forecast a permissible scope of delay and throughput of uplink traffic by showing explicitly a scheduling service and a quality of service (QoS) parameter related to the scheduling service, thereby the polling and transmission permission is provided in an appropriate time. The polling is a procedure that the base station allocates bandwidth to each terminal in response to the request of bandwidth allocation by the each terminal. The types of the scheduling service provided by the current specification are specified into an unsolicited grant service (UGS), real-time polling service (rtPS), non-real-time polling service (nrtPS), and best effort (BE). Additional band allocation request is possible through a piggybacking or polling, etc and with respect to other types of scheduling services other than the UGS bandwidth allocated for a connection can be re-distributed for another connection within a scope of total bandwidth allocated per a terminal.

An automatic repeat request (ARQ) protocol is selectively supported in the broadband wireless access system. A MAC SDU is divided into at least one ARQ fragment to be transmitted in a form of sliding window in a selective repeat ARQ scheme and error detection is performed per fragment with cyclic redundancy check (CRC). Parameters like ARQ_WINDOW_SIZE, ARQ_FRAGMENT_LIFETIME, ARQ_RETRY_TIMEOUT, etc are provided for the sliding window protocol and ACK or NACK is noticed through an ARQ-Feedback message. Types of the ACK can be classified into 'Selective ACK', 'Cumulative ACK', and 'Cumulative with Selective ACK'. One of the three types of ARQ scheme can be defined and used dynamically for a connection according to a mutual agreement between a transmitting side and a receiving side. The ACK can be transmitted to the transmitting side in a form of a MAC message independently or in a piggyback type. Receiving an ARQ fragment, the receiving side transmits an ACK feedback information element (IE) or data piggybacked with ACK/NACK as a reply to the transmitting side.

Table 1 and Table 2 represent a format of an ARQ feedback message and an ARQ feedback IE included in the ARQ feedback message, respectively. At least one ACK MAP is included in the ACK feedback IE for indicating the type of ACK and ARQ fragments received without error. The three types of ACK can be identified by the format constituting ACK MAP with respect to ARQ fragments with which errors occur.

TABLE 1

| Syntax | Size (bits) | Notes |
|---|---|---|
| ARQ_Feedback_Message_Format( ){ | | |
| Management Message Type = 33 | 8 | |
| ARQ_Feedback_Payload | variable | |
| } | | |

TABLE 2

| Syntax | Size (bits) | Notes |
|---|---|---|
| ARQ_feedback_IE(LAST){ | variable | |
|   CID | 16 | The ID of the connection being referenced. |
|   LAST | 1 | 0 = More ARQ feedback IE in the list<br>1 = Last ARQ feedback IE in the list. |
|   ACK Type | 2 | 0x0 = Selective ACK entry<br>0x1 = Cumulative ACK entry<br>0x2 = Cumulative with Selective ACK entry<br>0x3 = Cumulative ACK with Block Sequence ACK entry |
|   BSN | 11 | |
|   Number of ACK Maps | 2 | If ACK Type==01, the field is reserved and set to 00.<br>Otherwise the field indicates the number of ACK maps: 0x0=1, 0x1=2, 0x2=3, 0x3=4 |
|   if(ACK Type!=01){<br>    for(i=0; i<Number of ACK Maps+1; i++){<br>      if(ACK Type !=3){<br>        Selective ACK Map<br>      } | 16 | |
|       else{ | | Start of Block Sequence ACK Map definition (16 bits) |
|         Sequence Format | 1 | Number of block sequences associated with descriptor. 0: 2block sequences 1: 3block sequences |
|       if(Sequence Format=0){ | | |
|         Sequence ACK Map | 2 | |
|         Sequence 1 Length | 6 | |
|         Sequence 2 Length | 6 | |
|         Reserved | 1 | |
|       } | | |
|       else{ | | |
|         Sequence ACK Map | 3 | |
|         Sequence 1 Length | 4 | |
|         Sequence 2 Length | 4 | |
|         Sequence 3 Length | 4 | |
|       } | | |
|     } | | End of Block Sequence ACK Map definition |
|   } | | |
|   } | | |
| } | | |

FIGS. 5A-5C illustrate examples of a method of configuring the ACK MAP in accordance with each ACK type. In the type of 'Selective ACK' whether error occurs for each and every ARQ fragment is indicated by '0' or '1' to be noticed. In the type of 'Cumulative ACK' a frame sequence number (MSN) of the last ARQ fragment received without error is noticed. Meanwhile, 'Cumulative with Selective ACK' is a combination type of 'Selective ACK' and 'Cumulative ACK'.

The broadband wireless access system supports an idle mode to reduce power consumption of a terminal. In the case of the idle mode, although the terminal which has not yet been registered in a specific base station (BS) does not perform handover from one base station (BS) to other BS in a paging zone comprising a plurality of BS areas, the terminal receives a predetermined paging message (MOB-PAG-ADV), such that it can periodically recognize the presence or absence of downlink traffic toward the terminal itself, resulting in minimum power consumption of the MSS.

A paging-group-action message transmitted on wire between base stations may be used for configuring a paging zone. Table 3 is an example of a format of the paging-group-action message.

TABLE 3

| Field | Size (bits) | Notes |
|---|---|---|
| Paging-group-action Message Format( ) { | | |
| Message Type | 8 | |
| Sender BS-ID | 48 | Base station unique identifier (Same number as that broadcasted on the DL-MAP message) |
| Target BS-ID | 48 | Base station unique identifier (Same number as that broadcasted on the DL-MAP message) |
| Time Stamp | 32 | Number of milliseconds since midnight GMT (set to 0xffffffff to ignore) |
| Action | 4 | 0 - Assign target BS to paging groups<br>1 - Remove target BS from paging groups<br>2 - Query (which paging groups target BS belongs to?)<br>3 - Information (paging groups sender BS belongs to) |
| Num Records | 4 | Number of paging-group-ID records |
| For (j=0; j<Num Records; j++) { | | |
| Paging-group-ID | 16 | Paging-group-ID |
| PAGING_CYCLE | 16 | Cycle in which the paging message is transmit-ted within the paging group |
| PAGING OFFSET | 8 | MSS PAGING OFFSET parameter |
| } | | |
| Security field | TBD | A means to authenticate this message |
| CRC field | 32 | IEEE CRC-32 |
| } | | |

The Paging-group-action message is exchanged between a paging controller and a base station or between base stations. The Paging-group-action message may be used with the following four purposes according to action codes.

First, a target BS receiving the Paging-group-action message can be included in a specific paging group (Action=0). Second, the target BS can be deleted from a paging group (Action=1). Third, the target BS can be asked whether to belong to a paging group (Action=2). Fourth, the target BS can be informed to which paging group a sender BS belongs (Action=3).

Since a base station may belong to a plurality of paging zones, information associated with a plurality of paging groups can be included in the Paging-group-action message. Base stations can obtain a paging cycle and paging offset used in each paging zone through the Paging-group-action message. The Paging-group-action message enables base stations to be dynamically allocated in paging groups.

FIG. 6 illustrates an example of configuring a paging zone to which a plurality of base stations supporting idle mode belong.

A terminal uses a de-registration request (DREG-REQ) message for going into an idle mode state. Table 4 represents an example of a format of the DREG-REQ message.

TABLE 4

| Syntax | Size | Notes |
|---|---|---|
| DREG-REQ message format( ) { | | |
| Management message type = 49 | 8 bits | |
| De-registration_Request_Code | 8 bits | 0x00 = MSS de-registration request from BS and network<br>0x01 = request for MSS de-registration from Serving BS and initiation of MSS Idle Mode<br>0x02-0xFF = Reserved |
| TLV encoded parameters | variable | |
| } | | |

Table 5 describes 'TLV encoded parameters' of the DREG-REQ message in detail.

TABLE 5

| Name | Type | Length | Value |
|---|---|---|---|
| Paging Cycle Request | | 2 | Requested cycle in which the paging message is transmitted within the paging group. |
| Idle Mode Retain Information | | 1 | MSS request for Paging Controller retention of network re-entry related MAC management message MSS service and operational information to expedite future Network Re-entry from Idle Mode. For each Bit location, a value of '0' indicates the information associated with the specified MAC management message is not requested to be retained and managed, a value of '1' indicates the information is requested to be retained and managed.<br>Bit #0: Retain MSS service and operational information associated with<br>Bit #1: Retain MSS service and messages<br>Bit #2: Retain MSS service and operational SBC-REQ/RSP MAC management messages information associated with<br>REG-REQ/RSP MAC management<br>Bit #3: Retain MSS service and operational information associated with Network Address Bit #4: Retain MSS service and operational information associated with Time of Day Acquisition<br>Bit #5: Retain MSS service and operational information associated with TFTP MAC management messages<br>Bit operational information associated with PKM-REQ/RSP MAC management #6: Retain MSS service and operational information associated with Full service (MAC state machines, CS classifier information, etc . . . ) |

A terminal requests to shift its state into the idle mode by transmitting to a base station the DREG-REG message having '0x01' as the 'De-registration Request Code of the DREG-REG message. The terminal may deliver a preferable paging cycle and management resource information desired by the base station to be maintained after transition into the idle mode.

After receiving the DREG-REQ message, the base station may respond to it through a de-registration command (DREG_CMD) message. Table 6 is an example of a format of the DREG_CMD message.

TABLE 6

| Syntax | Size | Notes |
|---|---|---|
| DREG-CMD_Message_Format( ) { | | |
| Management Message Type = 29 | 8 bits | |
| Action Code | 8 bits | |
| TLV encoded parameters | variable | |
| } | | |

The base station may send the terminal a reply to the request of the state transition with 'Action Code' of the DREG_CMD message. For example, the Action Code '0x05' allows the state transition, '0x06' makes the terminal re-request the state transition after a specific time period, and '0x07' makes the terminal not request until the base station transmits the DREG_CMD message.

Table 7 describes the Action code of the DREG_CMD message and the meaning thereof in detail.

TABLE 7

| Action Code | Action |
|---|---|
| 0x00 | MSS shall immediately terminate service with the BS and attempt network entry at another BS |
| 0x01 | MSS shall listen to the current BS but shall not transmit until an RES-CMD message or DREG_CMD with Action Code 0x00 is received. |
| 0x02 | MSS shall listen to the current BS but only transmit on the Basic, Primary Management, and Secondary Management Connections. |
| 0x03 | MSS shall return to normal operation and may transmit on any of its active connections. |
| 0x04 | MSS shall terminate current Normal Operations with the BS; the BS shall transmit this action code only in response to any MSS DREG-REQ |
| 0x05 | require MSS de-registration from Serving BS and request initiation of MSS Idle Mode |
| 0x06 | The MSS may retransmit the DREG-REQ message after the time duration (REQ-duration) provided in the message |
| 0x07 | The MSS shall not retransmit the DREG-REQ message and shall wait the DREG-CMD message |
| 0x08-0xFF | Reserved |

The base station can transmit to the terminal a paging group ID, paging cycle, and paging offset to be maintained during the idle mode through a type length value (TLV) selectively included in the DREG_CMD message. Table 8 describes paging information included in the DREG_CMD message as a TLV parameter, management resource information of the terminal which is managed by the base station after state transition into the idle mode, and an identifier of a paging controller, etc. The information managed by the base station during the idle mode enables the terminal to perform a fast network registration and location update by omitting a procedure for obtaining the information when the terminal performs a procedure of idle mode termination, location update, or network registration.

TABLE 8

| Name | Type | Length | Value |
|---|---|---|---|
| Paging Information | | 4 | Bits 15:0 - PAGING_CYCLE - Cycle in which the paging message is transmitted within the paging group<br>Bits 23:16 - PAGING OFFSET - Determines the frame within the cycle in which the paging message is transmitted. Must be smaller than PAGING CYCLE value<br>Bits 31:24 - Paging-group-ID - ID of the paging group the MSS is assigned to |
| REQ-duration | | 1 | Waiting value for the DREG-REQ message retransmission (measured in frames) |
| Paging Controller ID | | 6 | This is a logical network identifier for the Serving BS or other network entity retaining MSS service and operational information and/or administering paging activity for the MSS while in IDLE Mode |
| Idle Mode Retain Information | | 1 | Idle Mode Retain Information is provided as part of this message is indicative only. Network Re-entry from Idle Mode process requirements may change at time of actual reentry. For each Bit location, a value of '0' indicates the information for the associated reentry management messages shall not be retained and managed, a value of '1' indicates the information for the associated re-entry management message shall be retained and managed<br>Bit #0: Retain MSS service and operational information associated with SBC-REQ/RSP MAC management messages<br>Bit #1: Retain MSS service and operational information associated with PKM-REQ/RSP MAC management messages<br>Bit #2: Retain MSS service and operational information associated with REG-REQ/RSP MAC management messages<br>Bit #3: Retain MSS service and operational information associated with Network Address<br>Bit #4: Retain MSS service and operational information associated with Time of Day<br>Bit #5: Retain MSS service and operational information associated with TFTP MAC management messages<br>Bit #6: Retain MSS service and operational information associated with Full service (MAC state machines, CS classifier information, etc.) |

Afterwards the terminal can maintain or terminate the idle mode by receiving a paging advertisement (MOB-PAG- ADV) message at a determined paging cycle and paging offset. Table 9 is an example of the MOB-PAG-ADV message.

TABLE 9

| Syntax | Size | Notes |
|---|---|---|
| MOB_PAG-ADV_Message_Format( ) { | | |
| Management Message Type=62 | 8 bits | |
| Num_Paging_Group_IDs | 8 bits | Number of Paging Group IDs in this message |
| For (i=0; i<Num_Paging_Group_IDs; i++) { | | |
| Paging Group ID | 8 bits | |
| } | | |
| Num_MACs | 8 bits | Number of MSS MAC addresses |
| For (j=0; j<Num_MACs; j++) { | | |
| MSS MAC Address hash | 24 bits | The hash is obtained by computing a CRC24 on the MSS 48-bit MAC address. The polynomial for the calculation is 0x864CFB |
| Action Code | 2 bit | Paging action instruction to MSS 00 = No Action Required 01 = Perform Ranging to establish location and acknowledge message 10 = Enter Network 11 = reserved |
| Reserved | 6 bits | |
| } | | |
| TLV Encoded Information | variable | TLV specific |
| reserved | variable | Padding bits to ensure octet aligned |
| } | | |

Actions of a terminal in the idle mode are summarized as follows.

1) Paging Zone: A paging zone is defined as a total region covered by a plurality of base stations belonging to a paging group. Base stations belonging to a paging group have an identical paging cycle and paging offset.

2) A terminal can request state transition into an idle mode to a base station and the base station may allow the state transition into the idle mode by transferring a paging group ID, a paging cycle, and a paging offset. At this time, the terminal and the base station enable timers for location update of the terminal in the idle mode.

3) During the idle state, the terminal is able to determine whether to maintain or terminate the idle mode, or to perform the location update through paging advertisement messages broadcasted from the base station at the paging cycle.

4) When uplink traffic data to be transmitted to the base station is generated at the terminal in the idle mode, the idle mode can be terminated at any time by the terminal.

5) When downlink traffic data to be transmitted to the terminal is generated at the base station, the base station may enable the terminal to terminate the idle mode through a paging advertisement message.

6) If the terminal in the idle state has missed a paging advertisement message at the paging cycle by loosing synchronization, etc the terminal terminates the idle mode and performs a procedure for network registration.

7) When the terminal in the idle mode has moved into another paging group or needs to perform location update using the timer, the terminal performs the location update by delivering a raging request message having a paging controller identifier and a location update instruction parameter to the base station with which the terminal is connected. The location update is performed by updating invalid parameters through a network re-registration procedure as necessary. The location update can be performed swiftly by omitting procedures which can be omitted according to management resource information managed by the base station.

Table 10 is an example of a raging request message transmitted by the terminal in the idle mode and table 11 is an example of location update information in a format of TLV parameter included in the raging request message for performing the location update of the terminal.

TABLE 10

| Syntax | Size | Notes |
|---|---|---|
| RNG-REQ_Message_Format( ) { | | |
| Management Message Type = 4 | 8 bits | |
| Downlink Channel ID | 8 bits | |
| TLV Encoded Information | variable | TLV specific |
| } | | |

TABLE 11

| Name | Type (1byte) | Length (byte) | Value (Variable-length) |
|---|---|---|---|
| Location Update Request | 8 | 1 | Presence of item in message indicates MSS action of Idle Mode Location Update Process, regardless of value |
| Paging Controller ID | 9 | 6 | This is a logical network identifier for the serving BS or other network entity retaining MSS service and operational information and/or administering paging activity for the MSS while in Idle Mode |

Table 12 is an example of a raging response message transmitted to the terminal by the base station after receiving the raging request message for the location update. Table 13 is an example of a location update information TLV parameter included in the raging response message.

TABLE 12

| Syntax | Size | Notes |
|---|---|---|
| RNG-RSP_Message_Format( ) { | | |
| Management Message Type = 5 | 8 bits | |
| Uplink Channel ID | 8 bits | |
| TLV Encoded Information | variable | TLV specific |
| } | | |

TABLE 13

| Name | Type (1byte) | Length (byte) | Value (Variable-length) |
|---|---|---|---|
| HO Process Optimization | 21 | 1 | For each Bit location, a value of '1' indicates the associated re-entry management messages shall be required, a value of '1' |

TABLE 13-continued

| Name | Type (1byte) | Length (byte) | Value (Variable-length) |
|---|---|---|---|
| | | | indicates the re-entry management message may be omitted. Regardless of the HO Process Optimization TLV settings, the Target BS may send unsolicited SBC-RSP and/or REG-RSP management messages Bit #0: Omit SBC-REQ/RSP management messages during current re-entry processing Bit #1: Omit PKM-REQ/RSP management message during current re-entry processing Bit #2: Omit REG-REQ/RSP management during current re-entry processing Bit #3: Omit Network Address Acquisition management messages during current reentry processing Bit #4: Omit Time of Day Acquisition management messages during current re-entry processing Bit #5: Omit TFTP management messages during cur-rent re-entry processing Bit #6: Full service and operational state transfer or sharing between Sserving BS and Target BS (ARQ, timers, counters, MAC state machines, etc . . . Bit #7: post-HO re-entry MSS DL data pending at Ttar-get BS |
| Location Update Response | 23 | 1 | 0x00 = Failure of Location Update. The MSS shall perform Network Re-entry from Idle Mode 0x01 = Success of Location Update 0x10, 0x11: Reserved |
| Paging Information | 24 | 4 | Paging Information shall only be included if Location Update Response = 0x01 and if Paging Information has changed Bits 15:0 - PAGING_CYCLE - Cycle in which the pag-ing message is transmitted within the paging group Bits 23:16 - PAGING OFFSET - Determines the frame within the cycle in which the paging message is transmitted. Must be smaller than PAGING CYCLE value Bits 31:24 - Paging Group ID - ID of the paging group the MSS is assigned to |
| Paging Controller ID | 25 | 6 | This is a logical network identifier for the Sserving BS or other network entity retaining MSS service and operational information and/or administering paging activity for the MSS while in Idle Mode. Paging Controller ID shall only be included if Location Update Response = 0x01 and if Paging Controller ID has changed |

A multicast and broadcast service (MBS) in a broadband wireless access system is described in detail as follows.

The MBS is a point-to-multipoint service provided by a source to a plurality of receivers through a common radio channel for using the radio resources efficiently.

FIG. 7 and FIG. 8 illustrate a reference model for a MBS in a broadband wireless access system.

As depicted in FIG. 7, a system for providing an MBS comprises an MBS media server, an MBS distribution server, a plurality of base stations (BSs), and a plurality of mobile subscriber stations (MSSs). The MBS media server provides the plurality of base stations with MBS data and performs authentication and encryption key distribution to the plurality of MSSs for MBS contents. The MBS distribution server performs scheduling of the MBS data transmitted to the plurality of BSs. Alternatively, the MBS media server may perform the scheduling of the MBS data without the MBS distribution server. The BS provides the plurality of MSSs through air interface with the MBS data received through a backbone network and the MSSs receive the MBS data from the BSs.

The MBS in the broadband wireless access system has the following features.

1) Minimization of power consumption: An MSS is able to minimize power consumption during receiving MBS data notwithstanding a current mode (e.g. normal mode, sleep mode, or idle mode) of the MSS.

2) Mobility: An MSS is provided with a seamless MBS connection during moving into other BS.

3) MBS Zone: MBS data is transmitted through MBS zones which are divided by location and different MBS zones may have different MBS establishment information (e.g. MBS connection identifiers, encryption keys, service identifiers, etc)

4) Security: The MBS data is transmitted to authenticated users only. An identical encryption key for MAC PDUs can be applied to BSs belonging to a MBS zone.

FIG. 9A and FIG. 9B illustrates procedures for a MBS in broadband wireless access system.

(1) If an MSS in an idle mode wishes to receive MBS data, the MSS terminates the idle mode and goes into a normal mode.

(2) The MSS requests MBS contents lists to at least one MBS media server through a HTTP request message.

(3) The MBS media server transmits a HTTP response message in which a MBS contents list is included. The MBS contents list included in the HTTP response message may contain a name of the MBS contents, a multicast IP address, and a port number, etc.

(4) The MSS acquiring MBS information may shift into the idle mode or maintain the normal mode.

(5) After acquiring the MBS information, the MSS transmits a service generation request (DSA-REQ) message having the multicast IP address and the port number of the MBS contents to the BS. The DSA-REQ message may be transmitted from the BS to the MSS.

(6) The BS transmits a DSX-RVD message notifying the MSS of the reception of the DSA-REQ message and performs an authentication procedure for determining whether the user is appropriate to receive the MBS contents.

(7) After performing the authentication procedure, the BS provides the MSS with downlink service parameter information (e.g. a service identifier, a multicast connection identifier, a service quality parameter, a security association identifier (SAID), etc) included in the DSA-RSP message to be transmitted.

(8) The MSS transmits a key request (PKM-REQ) message to the BS for acquiring a MBS key with which encrypted MBS PDUs can be decrypted.

(9) The BS transmits a key response (PKM-RSP) message including an MBS key to the MSS.

(10) The MSS decrypts the encrypted MAC PDU received from the BS.

A MBS zone is described in detail as follows.

MBS related parameters (e.g. a security key, a multicast connection identifier, etc) can be established differently according to regions and MBS data can be broadcasted within a limited region. Accordingly, when the MSS receiving the MBS data performs handover, the MSS must check whether the MBS information stored in the MSS is valid and the MSS can receive the MBS contents continuously. If a target BS transmits the MBS using parameters different from the information stored in the MSS or does not provide the MBS, the MSS must update parameters for the MBS or access a new BS. To solve such problems the broadband wireless access system adopted the concept of MBS zone within which at least one BS is grouped.

Base stations in an MBS zone transmit the MBS data using identical MBS parameters to MSSs and provide the MSSs with an MBS zone identifier (ID) so that the MSSs recognize the MBS zone. An MSS can check whether the stored MBS information is valid with the MBS zone ID instantaneously. When the MSS moves from a BS into another BS belonging to the same MBS zone, processes for re-establishing MBS related parameters for receiving the MBS are unnecessary. Further, since BSs in the same MBS zone transmit the MBS data using the same radio resources at the same time efficiency of the MBS data reception in the MSSs can be improved with the effect of macro diversity.

Actions for minimizing power consumption in an MSS receiving MBS data are described in detail as follows.

An MSS can diminish power loss during receiving the MBS data notwithstanding a current mode (e.g. a normal mode, sleep mode, or idle mode). A downlink MAP information element (DL-MAP IE) included in a downlink MAP (DL-MAP) message is defined as to indicate bursts transmitted in a current frame. The MSS has to, however, receive and interpret the DL-MAP message in every frame for receiving broadcasted bursts, by which the power loss cannot be diminished. The PS informs the MSS of accurate frames within which the MBS data for the MSS is included so that the MSS does not have to interpret other frames within which the MBS data for the MSS is not included, thereby the power loss can be minimized. Especially, the MBS_MAP IE is more efficient for MSSs in a sleep mode or idle mode. Such scheduling information for the MBS data bursts can be transmitted through an MBS_MAP IE which is one of DL-MAP IEs or in a form of an MAC management message like an MBS MAP message. Table 14 and Table 15 are examples of the MBS_MAP IE and the MBS MAP message, respectively.

TABLE 14

| Syntax | Size (bits) | Notes |
|---|---|---|
| MBS_MAP_IE{ | | |
|   Extended DIUC | 4 | MBS_MAP = 0x05 |
|   Length | 4 | |
|   Multicast CID | 12 | 12 LSB of CID for multicast |
|   MBS Zone identifier | 7 | MBS Zone identifier corresponds to the identifier provided by the BS at connection initiation |
|   Macro diversity enhanced | 1 | 0 = Non Macro-Diversity enhanced zone, 1 = Macro-Diversity enhanced zone |
|   If(Macro diversity enhanced=1) { | | |
|     Permutation | 2 | 0b00 = PUSC permutation, 0b01 = FUSC permutation, 0b10 = Optional FUSC permutation, 0b11 = Adjacent subcarrier permutation |
|     Idcell | 6 | |
|     OFDMA Symbol Offset | 8 | OFDMA symbol offset with respect to start of the MBS portion |
|     Boosting | 3 | It is used to indicate whether boosting is used or not for MBS_MAP message 000: normal (not boosted; 001: +6 dB; 010: −6 dB; 011: +9 dB; 100: +3 dB; 101: −3 dB; 110: 09 dB; 111: −12 dB |
|     DIUC | 4 | DIUC for MBS_MAP message in MBS portion |
|     NO. Subchannels | 6 | It is indicate the size of MBS_MAP message in MBS portion |
|     NO. OFDMA symbols | 2 | It is indicate the size of MBS_MAP message in MBS portion |
|   }else{ | | |
|     DIUC | 4 | |
|     OFDMA Symbol Offset | 8 | The offset of the OFDMA symbol in which the burst starts, measured in OFDMA symbols from beginning of the downlink frame in which the DL-MAP is transmitted. |
|     Subchannel offset | 6 | The lowest index OFDMA subchannel used for carrying the burst, starting from subchannel 0. |
|     Boosting | 3 | 000: normal(not boosted); 001: +6 dB; 011: +9 dB 010: −6 dB; 100: +3 dB; 101: −3 dB; 110: −9 dB; 111: −12 dB; |
|     NO. OFDMA Symbols | 7 | |
|     NO. Subchannels | 6 | |
|     Repetition | 2 | 0b00—No repetition coding |

TABLE 14-continued

| Syntax | Size (bits) | Notes |
|---|---|---|
| Coding Indication | | 0b01—Repetition coding of 2 used<br>0b10—Repetition coding of 4 used<br>0b11—Repetition coding of 6 used |
|     Mext MBS Frame offset | 8 | The Next MBS frame offset value is lower 8 bits of the frame number in which the BS shall transmit the next BS frame. |
|     Next MBS OFDMA Symbol offset | 8 | The offset of the OFDMA symbol in which the next MBs portion starts, measured in OFDMA symbols from the beginning of the downlink frame in which the MBS-MAP is transmitted. |
| }<br>if!(byte boundary){<br>  Padding Nibble<br>}<br>} | variable | Padding to reach byte boundary |

TABLE 15

| Syntax | Size (bits) | Notes |
|---|---|---|
| MBS-MAP Message Format( ){ | | |
|   Management Message Type = ? | 4 | |
| Frame number | 4 | The frame number is identical to the frame number in the DL-MAP |
|   MBS_DIUC_Change_Count | 8 | |
|   #MBS_DATA_IE | 4 | Number of included MBS_DATA_IE |
|   For(i = 0; i<n; i++){ | 12 | N = #MBS_DATA_IE |
|     MBS_DATA_IE | variable | |
| } | 8 | |
| #MBS_DATA_Time_Diversity_IE | 4 | Number of included MBS_DATA_Time_Diversity_IE |
|   For(i = 0; i<m; i++){<br>MBS_DATA_Time_Diversity_IE | | M = #MBS_DATA_Time diversity IE |
| | variable | |
| }<br>TLV encoding element<br>If(!byte boundary){<br>   Padding_Nibble<br>} | 8 | |

Table 16 is an example of an MBS_DATA IE included in the MBS MAP message.

TABLE 16

| Syntax | Size (bits) | Notes |
|---|---|---|
| MBS_DATA_IE{ | | |
|   MBS_MAP Type = 0 | 4 | |
|   Multicast CID | 12 | 12 LSB of CID for multicast |
|   MBS_DIUC | 4 | |
|   OFDMA Symbol offset | 8 | OFDMA symbol offset with respect to start of the MBS portion |
|   Subchannel offset | 6 | |
|   Boosting | 3 | 000: normal (not boosted);<br>001: +6 dB; 011: +9 dB<br>010: −6 dB;<br>100: +3 dB; 101: −3 dB;<br>110: −9 dB; 111: −12 dB; |
|   NO. OFDMA Symbols | 7 | |
|   NO. Subchannels | 6 | |
|   Repetition Coding Indication | 2 | 0b00—No repetition coding<br>0b01—Repetition coding of 2 use<br>0b10—Repetition coding of 4 used<br>0b11—Repetition coding of 6 used |
|   Next MBS frame offset | 8 | The Next MBS frame offset value is lower 8bitgs of the frame number in which the BS shall transmit the next MBS frame |
|   Next MBS OFDMA Symbol offset | 8 | The offset of the OFDMA symbol in which the next MBS portion starts, measured in OFDMA symbols from the beginning of the downlink frame in which the MBS-MAP is transmitted. |
| } | | |

During a procedure of generating a service flow for data transmission is performed in a broadband wireless access system, an MSS and a BS establish a connection for the service flow, negotiate service quality parameters, negotiate whether to apply an ARQ protocol to the connection. When the ARQ protocol is applied, parameters for the ARQ protocol are delivered.

Retransmission for an MBS connection, however, is not permitted in the broadband wireless access system in accordance with the conventional art. Accordingly, although an MSS cannot receive some MBS data or receives MBS data having errors due to deterioration of channel circumstances, there has been no way to correct the problems. Further, as described above, the ARQ protocol is defined only for a unicast connection between a BS and an MSS in the conventional system, since reception probability at the time of retransmission can be increased by re-configuring burst profiles (e.g. FEC coding type, modulation type) appropriately according to the channel circumstances based on quality of upload and download signals between a BS and an MSS.

In the case of an MBS, however, since the MBS data is not unicasted by the BS to a specific MSS, but broadcasted to at least one MSS, it is difficult to provide all MSSs receiving the MBS data with appropriate burst profiles and to transmit the MBS data with the most robust burst profiles using radio resources efficiently.

Namely, the conventional art has a problem that the burst profile for transmitting the MBS data cannot be configured appropriately according to the channel circumstances since feedback for the MBS connection has not been defined. Accordingly, it is possible that an MSS cannot receive the MBS data, if the MSS has bad channel circumstances.

Meanwhile, in the conventional ARQ protocol feedback information is transmitted through an ARQ feedback MAC management message from an MSS to a BS. Alternatively, the feedback information is piggybacked in uplink bands having no relation with the retransmission, which the MSS transmits to the BS with a different connection ID. In this case, the MSS can transmit the feedback information to the BS only after the MSS requests uplink band for data transmission and then is allocated the uplink band from the BS. Accordingly, specific procedures for the uplink band request, the uplink band allocation, and transmission of feedback information through the allocated uplink band are needed.

DISCLOSURE OF INVENTION

Accordingly, the present invention is directed to a method of controlling data transmission for an MBS in a broadband wireless access system, whereby the reception quality of MBS data can be ensured.

It is an object of the present invention is to provide a method of controlling data transmission for MBS, enabling MSSs to increase the reception efficiency of the MBS data and securing quality of a multicast and broadcast service (MBS) by transmitting the MBS data using an appropriate burst profile changed by the BS based on MBS data feedback information received from at least one MSS.

It is another object of the present invention is to provide a method of controlling data transmission for MBS, enabling base stations to configure burst profiles for MBS data appropriately by receiving feedback information from MSSs receiving the MBS data, thereby minimizing reception errors in the MSSs and making efficient use of radio resources.

These and other objects, purposes, and advantages are provided in a method of controlling data transmission for a multicast and broadcast service (MBS) in a broadband wireless access system, comprising a step of receiving MBS data feedback information including information associated with a coding and modulation scheme from at least one terminal. The method may further comprise a step of selecting a coding and modulation scheme for transmitting MBS data.

As another aspect of the present invention, a method of controlling data transmission for a multicast and broadcast service (MBS) in a broadband wireless access system comprises the steps of receiving MBS data from a base station, determining whether the MBS data has errors, and transmitting, when the MBS data has the errors, MBS data feedback information including information associated with a coding and modulation scheme for transmitting the MBS data.

As another aspect of the present invention, a method of controlling data transmission for a multicast and broadcast service (MBS) in a broadband wireless access system comprises the steps of transmitting MBS data to at least one terminal, receiving MBS data feedback information including information associated with a coding and modulation scheme from the at least one terminal, selecting a coding and modulation scheme for transmitting MBS data, and transmitting MBS data using the selected coding and modulation scheme to the at least one terminal.

As another aspect of the present invention, a method of controlling data transmission for a multicast broadcast service (MBS) at a terminal in a broadband wireless access system comprises the steps of receiving data for the MBS from a base station, determining whether to request modification of a coding and modulation scheme for transmitting the MBS data, and transmitting MBS data feedback information including information associated with a desired coding and modulation scheme, if the modification is determined to be necessary As another aspect of the present invention, a method of controlling data transmission for a multicast and broadcast service at a terminal in an idle mode comprises the steps of receiving MBS data from a base station, acquiring uplink transmission synchronization, and transmitting MBS data feedback information including downlink burst profile information associated with transmission of the MBS data.

As another aspect of the present invention, a method of controlling data transmission for a multicast and broadcast service (MBS) in a broadband wireless access system comprises the steps of transmitting MBS data to at least one terminal in an idle mode, receiving MBS data feedback information including downlink burst profile information associated with transmission of the MBS data from the at least one terminal, selecting a coding and modulation scheme for transmitting MBS data, and transmitting MBS data using the selected coding and modulation scheme to the at least one terminal.

BRIEF DESCRIPTION OF DRAWINGS

FIG. 4B illustrates an example of a band request header.

BEST MODE FOR CARRYING OUT THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
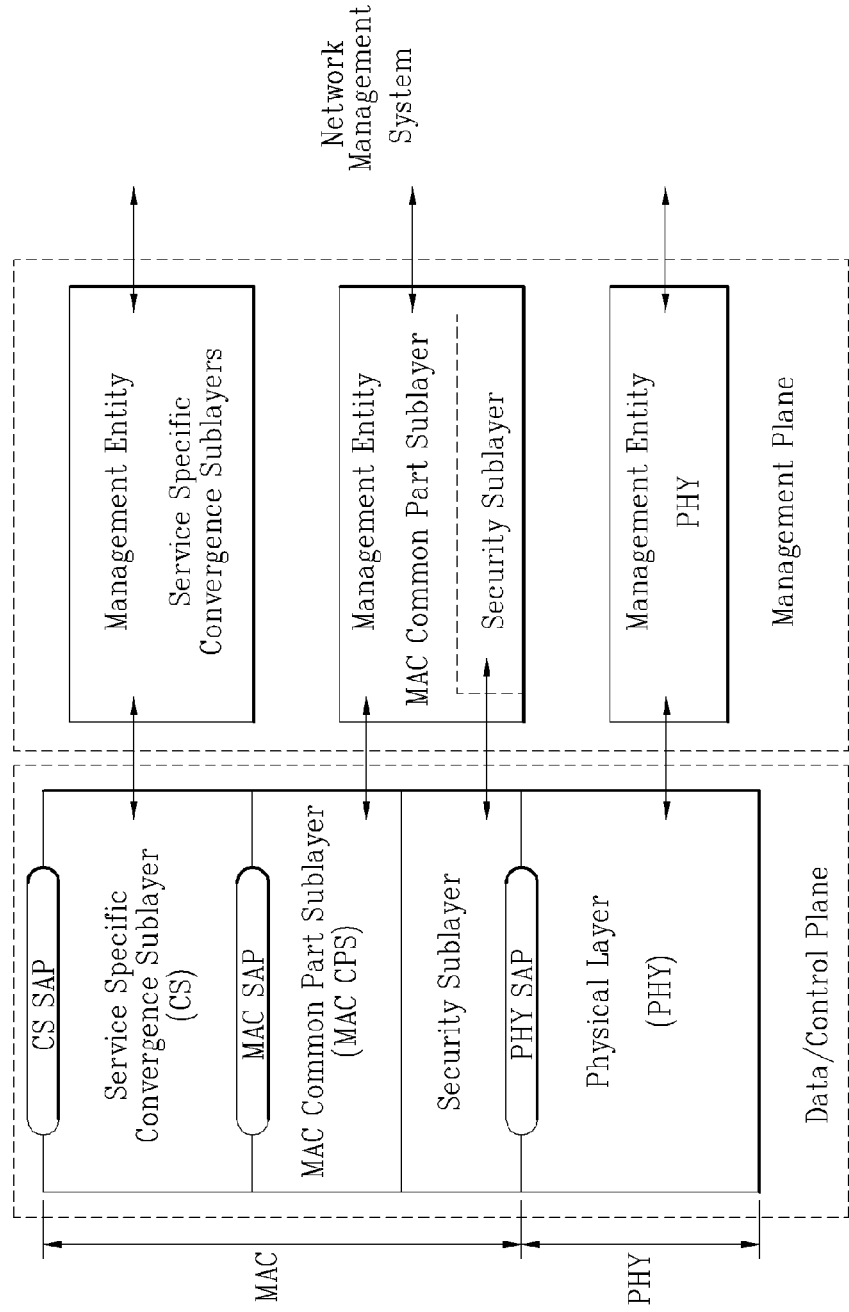
FIG. 1 illustrates a hierarchical protocol structure of a broadband wireless access system.
Figure 2:
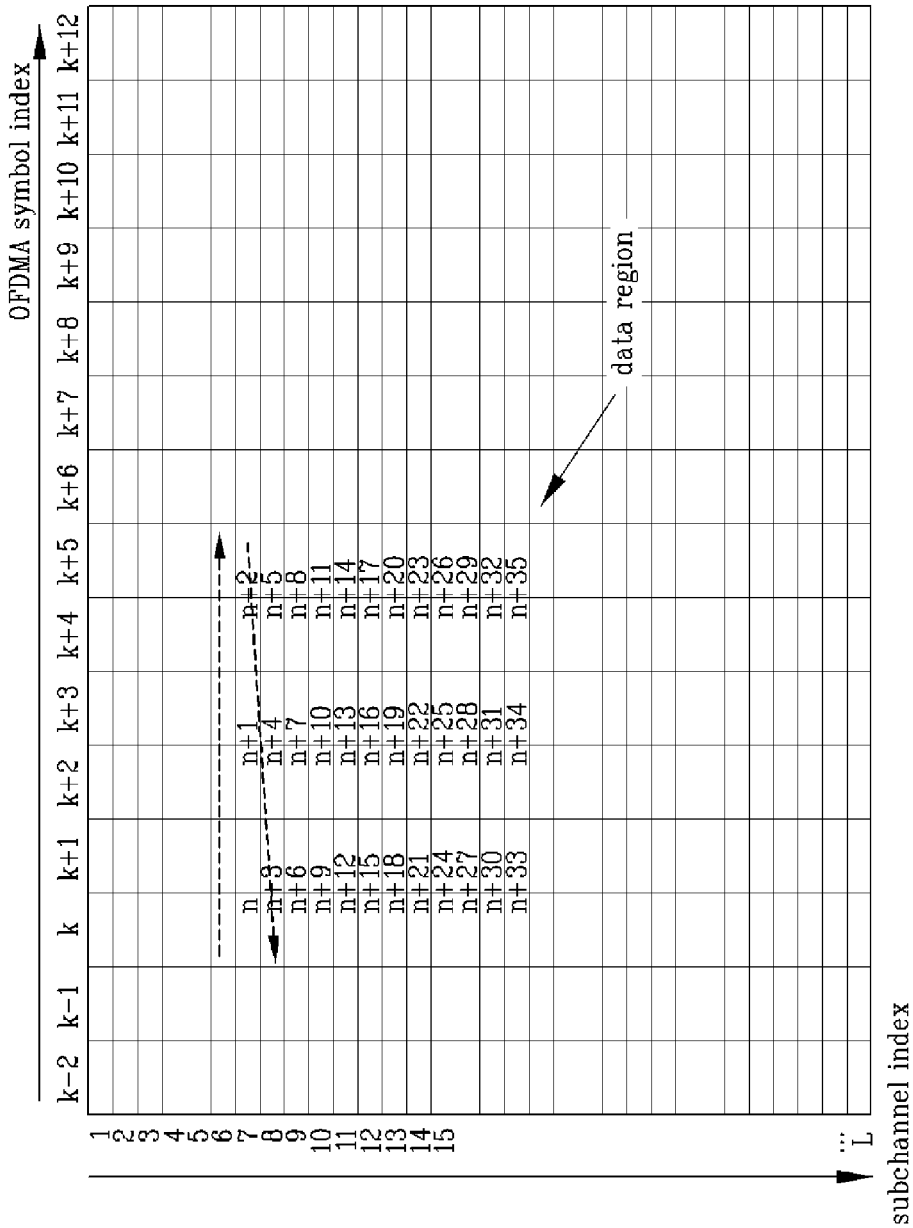
FIG. 2 illustrates a procedure of mapping FEC blocks to OFDMA subchannels and OFDMA symbols.
Figure 3:
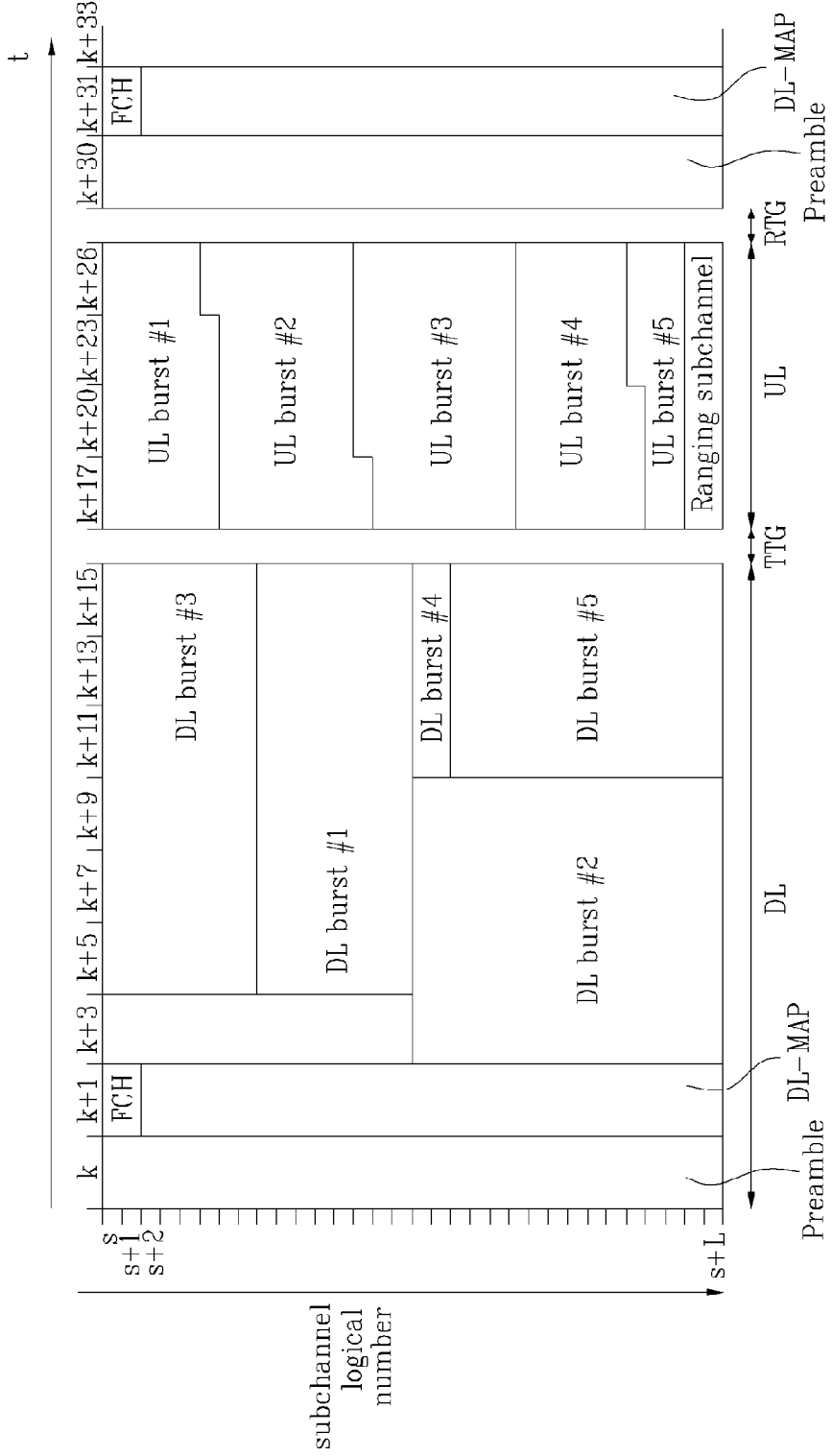
FIG. 3 illustrates structure of a frame of a physical channel in an OFDMA broadband wireless access system.
Figure 4A:
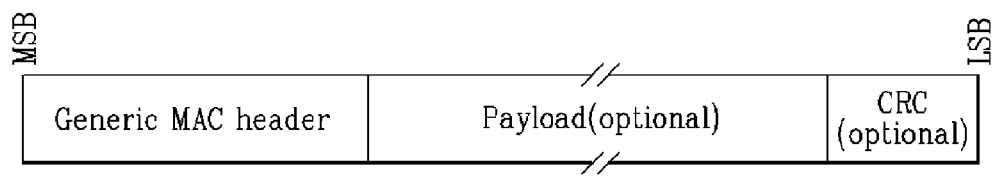
FIG. 4A illustrates a format of a MAC PDU.
Figure 4C:
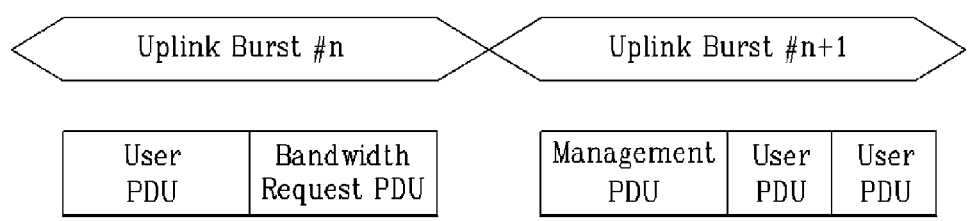
FIG. 4C illustrates an example of an uplink burst including a plurality of consecutive MAC PDUs.
Figure 5A:
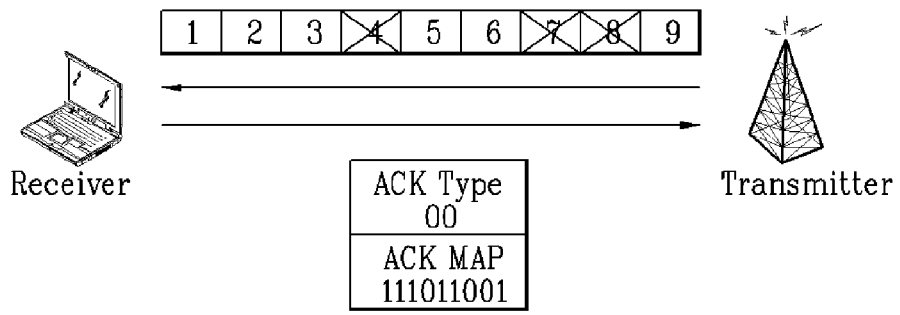
FIGS. 5A-5C illustrate examples of a method of configuring an ACK MAP in accordance with each ACK type.
Figure 5B:
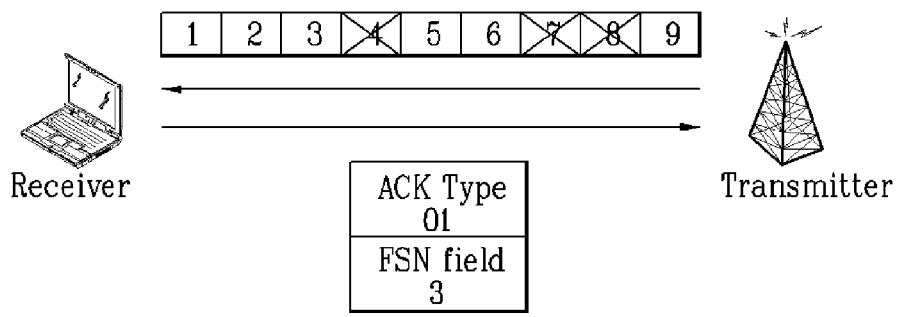
Figure 5C:
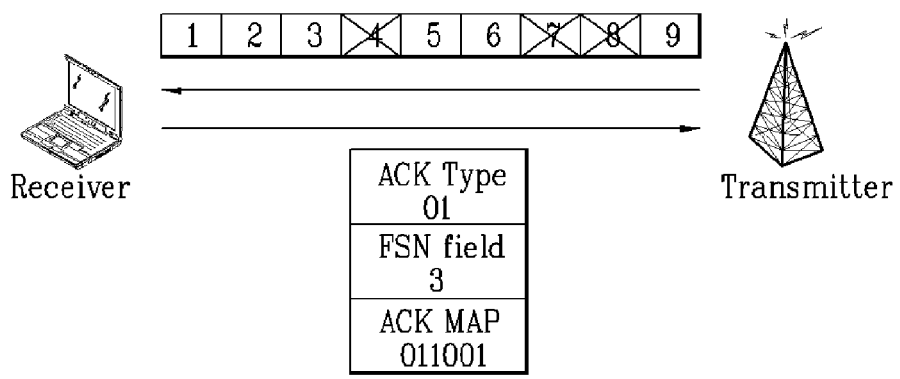
Figure 6:
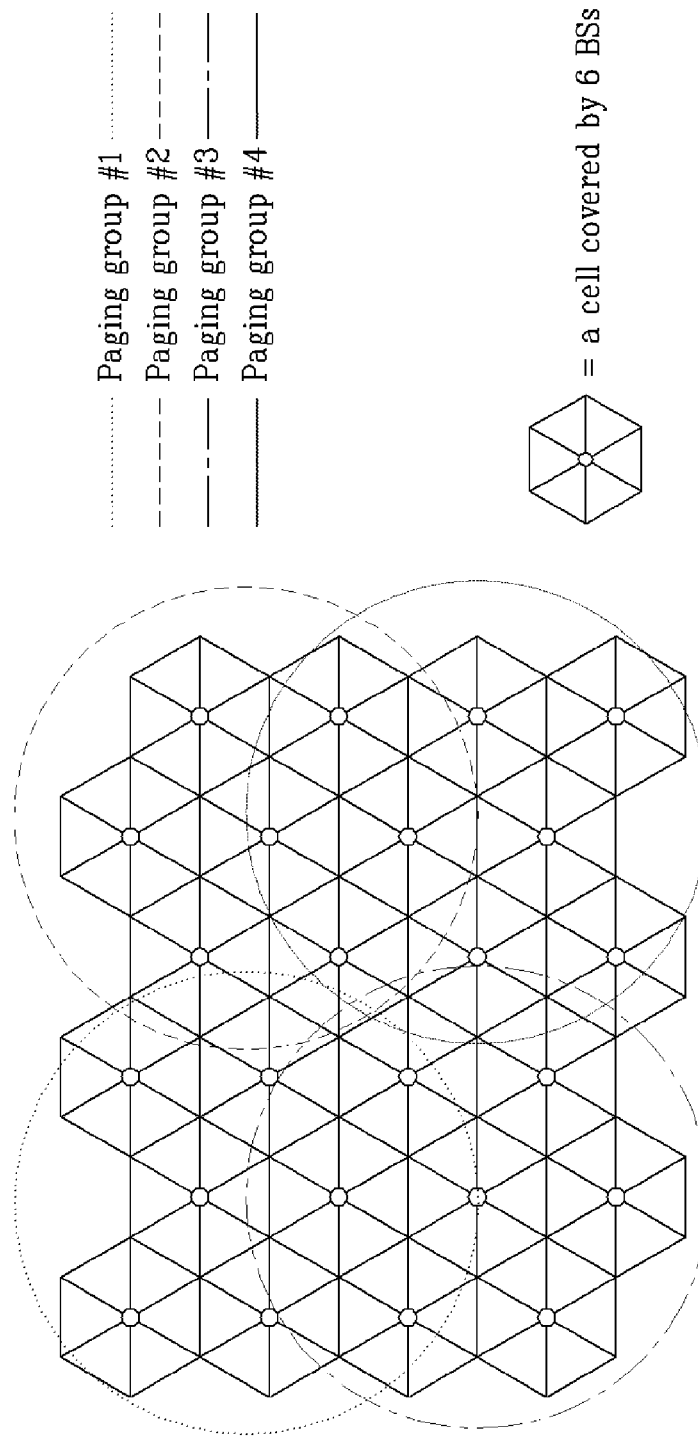
FIG. 6 illustrates an example of configuring of a paging zone to which a plurality of base stations supporting idle mode belong.
Figure 7:
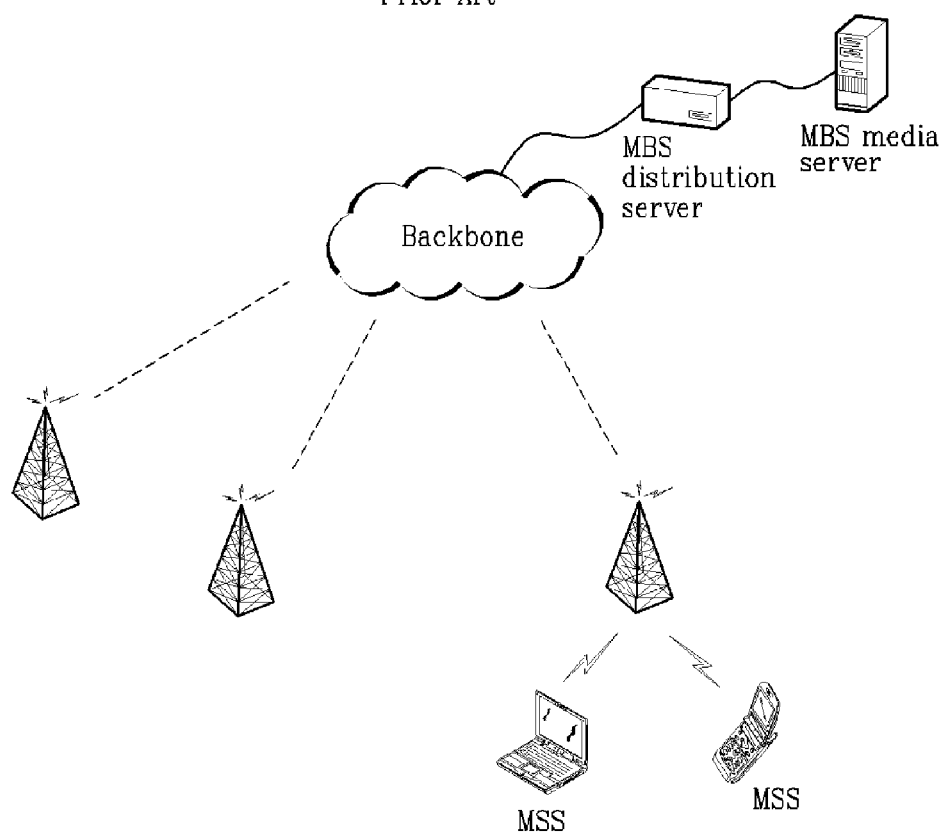
FIG. 7 and FIG. 8 illustrate a reference model for an MBS in a broadband wireless access system.
Figure 8:
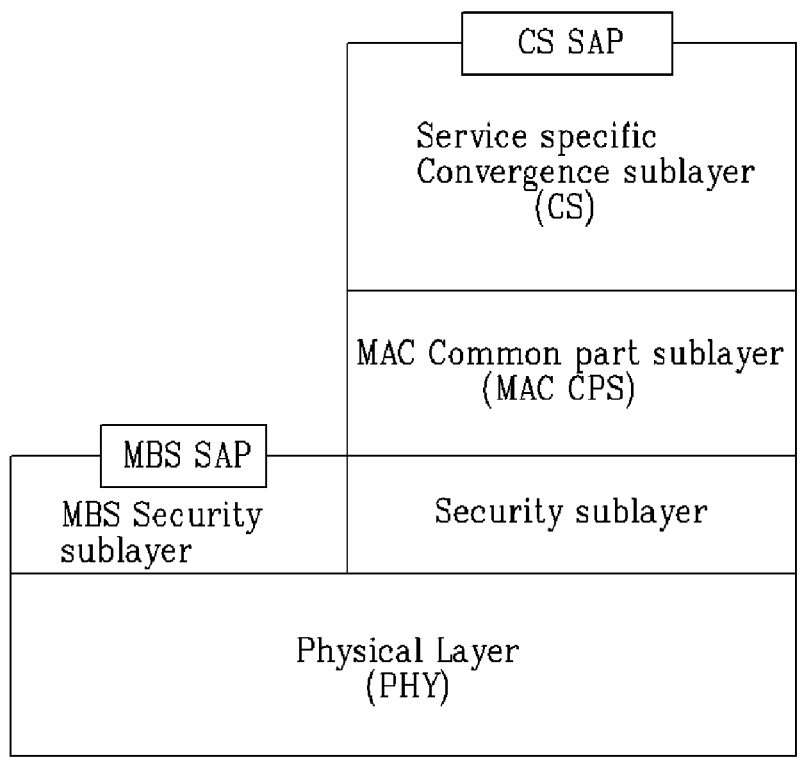
Figure 9A:
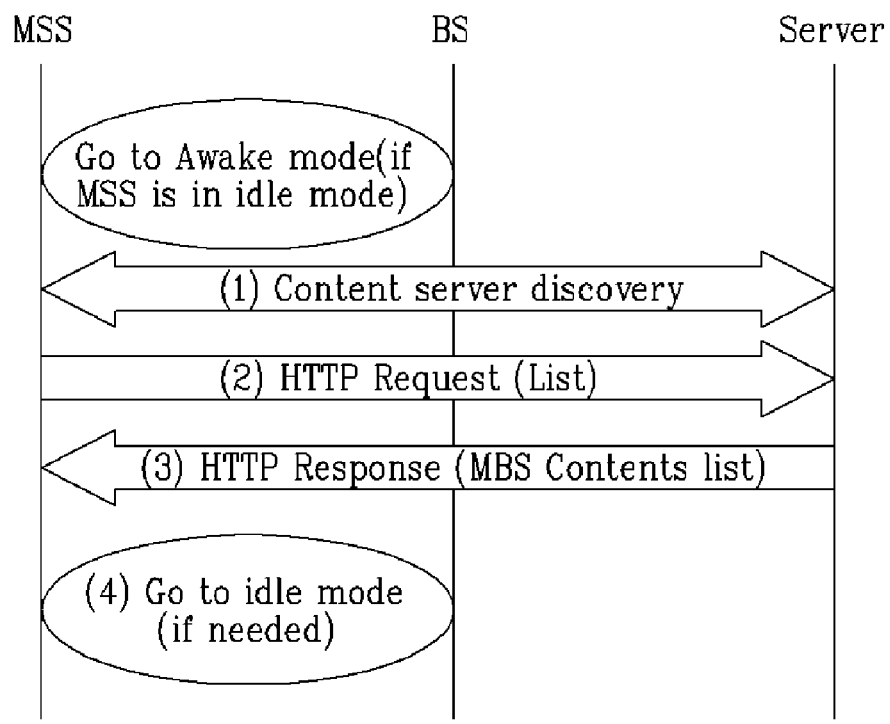
FIG. 9A and FIG. 9B illustrates procedures for an MBS in broadband wireless access system.
Figure 9B:
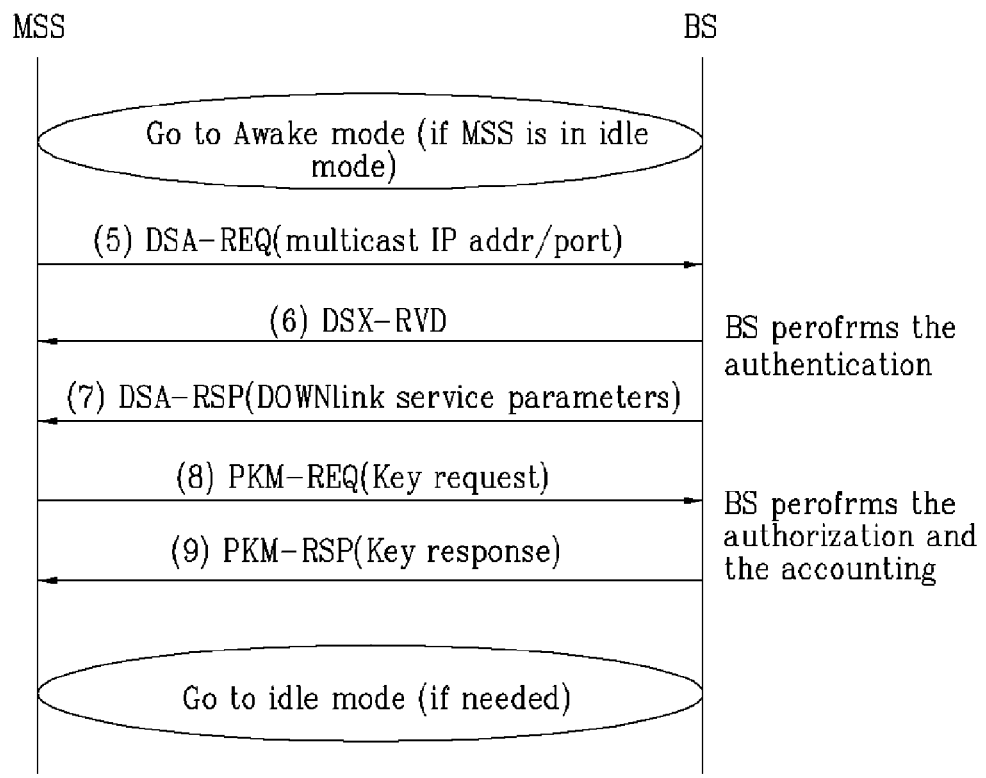
Figure 10:
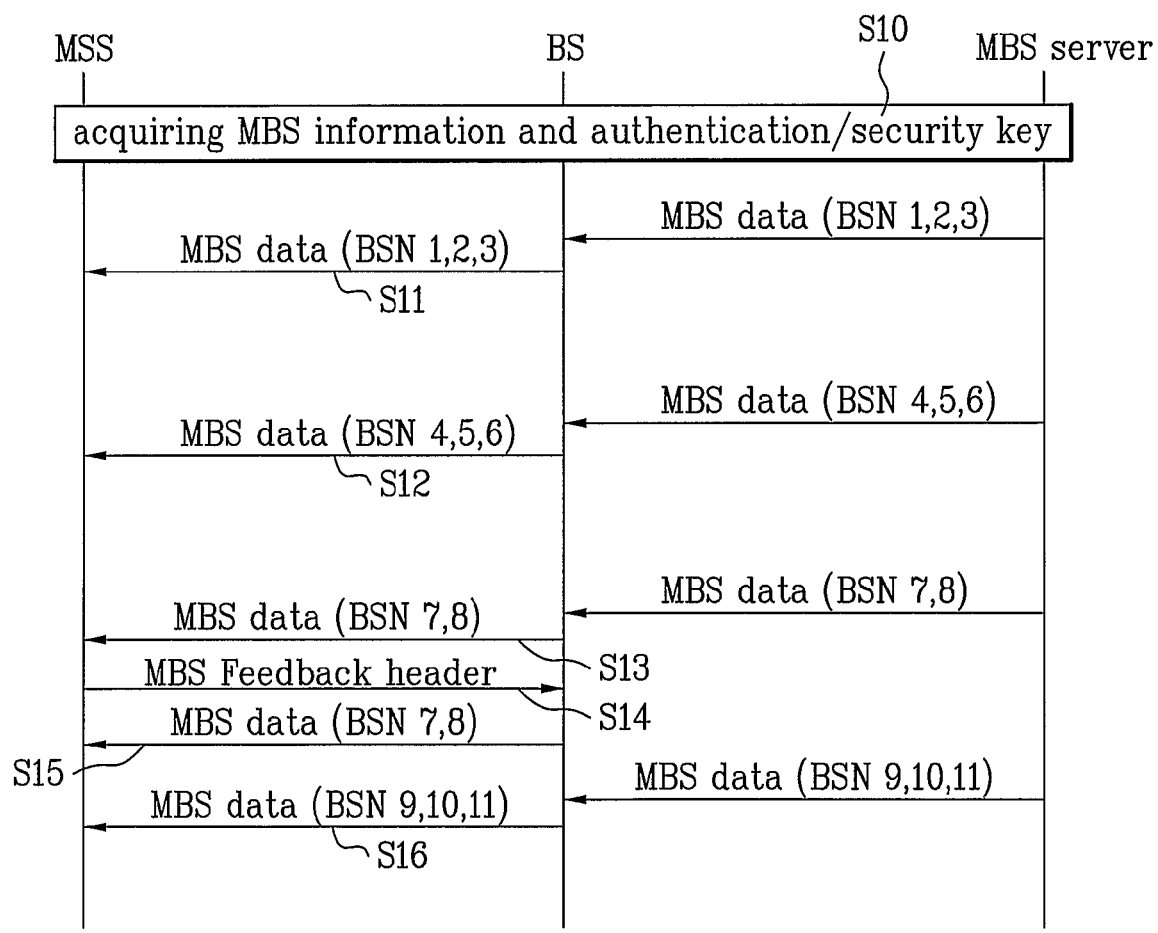
FIG. 10 and FIG. 11 illustrate flowcharts of preferred embodiments according to the present invention.
Figure 11:
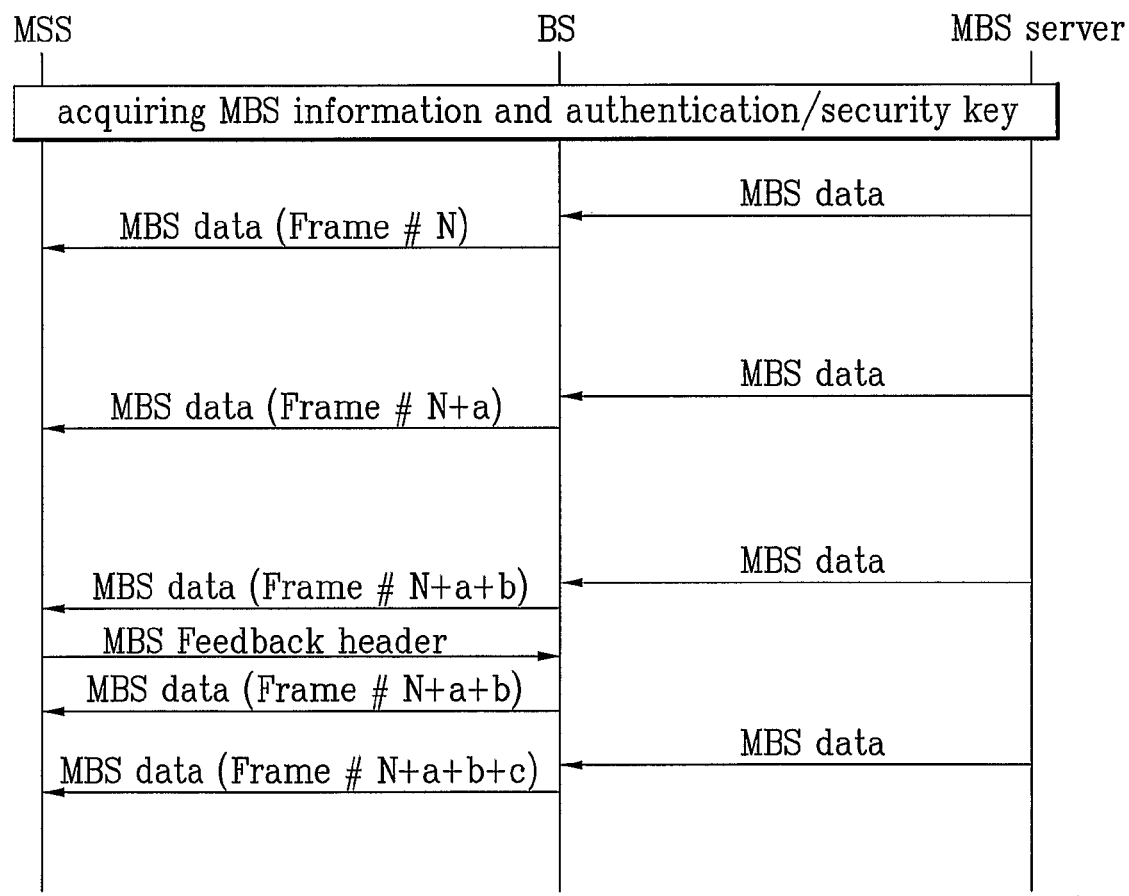

FIG. 10 and FIG. 11 illustrate flowcharts of preferred embodiments according to the present invention.

Referring FIG. 10, a mobile subscriber station (MSS) acquires information associated with a multicast and broadcast service (MBS) from an MBS server and a connection identifier (CID) and authentication/encryption keys from a base station (BS) through a service generation procedure and an authentication procedure [S10].

The MBS server delivers MBS data to the BS and the BS transmits the MBS data to the MSS after informing the MSS of location information of MBS data bursts in a current frame, a coding and modulation scheme, and scheduling information of next data frames through an MBS MAP (an MBS_MAP IE or MBS MAP message, see Table 14 and 15) [S11]. The MSS receives the corresponding data bursts.

The MSS receives MBS MAPs and MBS data in following frames based on the scheduling information of the MBS data burst obtained from the MBS MAP.

The BS transmits MBS data continuously to the BS, which is delivered from the MBS server [S12]. After receiving MBS data [S13], the MSS checks whether the received MBS data has errors. If the MBS data has errors, the MSS transmits feedback information for the MBS data having the errors to the BS [S14]. Although the MBS data has no error, the MSS may transmit the MBS data feedback information if it is considered to be necessary.

The main contents of the MBS data feedback information is information associated with a coding and modulation scheme suitable for receiving the MBS data having errors. Preferably, the MBS data feedback information further includes identification information of the MBS data and a connection ID (CID) for transmission of the MBS data.

The MBS data can be transmitted in a unit of data block or frame. When the MBS data is transmitted in the unit of data block, the identification information of the MBS data is preferably a block sequence number (BSN) of the MBS data. On the contrary, if the MBS data is transmitted in the unit of frame, a frame number is preferably used as the identification information. FIG. 10 is an embodiment in which the BSN is used and FIG. 11 is another embodiment in which the frame number is used as the identification information.

The BS having received the information associated with the coding and modulation scheme suitable for receiving the MBS data from the MSS transmits the MBS data using the coding and modulation scheme so that the MSS can receive the MBS data without errors. If the BS receives the MBS data feedback information from two or more MSSs, it is preferable for the BS to determine a coding and modulation scheme for transmitting MBS data included in a following frame based on the MBS data feedback information. Burst profiles, i.e. coding and modulation schemes of MSSs which transmit no MBS data feedback information may be considered in determining the coding and modulation scheme for the following frame.

Figure 12:
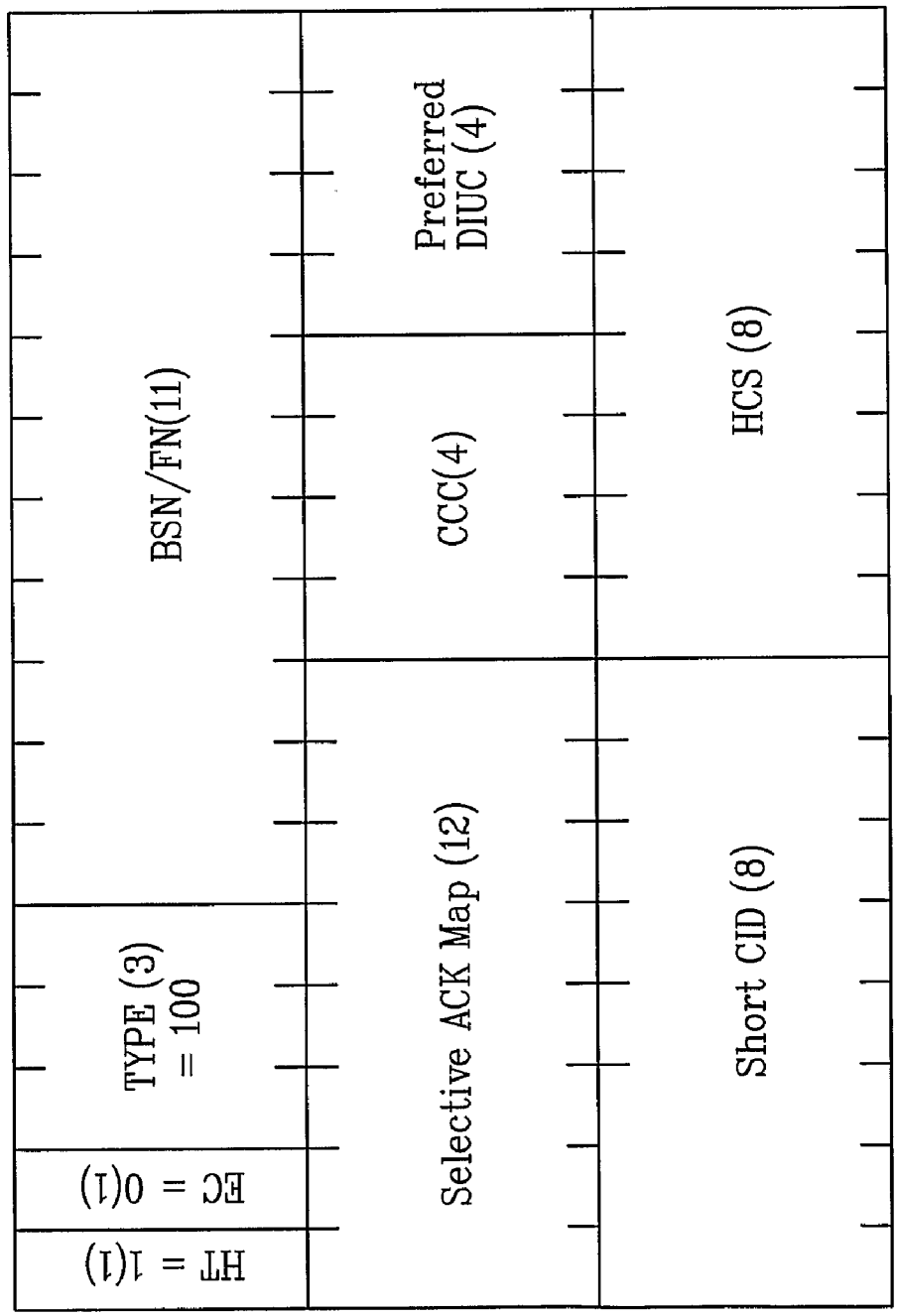
FIG. 12 illustrates an example of an MBS feedback header including MBS data feedback information in accordance with a preferred embodiment of the present invention.

The MBS data feedback information may preferably be included in a MBS feedback header to be transmitted. FIG. 12 illustrates an example of the MBS feedback header including the MBS data feedback information in accordance with a preferred embodiment of the present invention. Each field of the MBS feedback header in FIG. 12 are described in detail below.

1) HT (Header Type): 'HT' indicates a type of the MBS feedback header. For example, 'HT' of '1' indicates the header is transmitted without payload.

2) EC (Encryption Control): 'HC' indicates whether payload is encrypted or not. For example, 'HC' of '0' indicates the payload is not encrypted.

3) Type: 'Type' indicates a type of the header without the payload. A value indicating the MBS feedback header is included in 'Type'.

4) BSN (Block Sequence Number) or FN (Frame Number): 'BSN' or 'FN' indicates a block sequence number or a frame number, respectively of the last MBS data which an MSS has received successfully. For example, 11 bits of the least significant bit (LSB) of the block sequence number or frame number of the last MBS data which the MSS has received successfully can be included in 'BSN' or 'FN'.

5) Selective ACK MAP: 'Selective ACK MAP' indicates whether each MBS data block or frame has error from the last MBS data block or frame received successfully and each bit represents an MBS data block or frame. For example, when the MSS receives an MBS data block or frame without error, a corresponding bit is set up with '1'.

6) CCC (Configuration Change Count): 'CCC' is a configuration change count of a downlink channel descriptor (DCD) defining a burst profile associated with 'Preferred DIUC' described below. Namely, 'CCC' can be said to be an identifier of the DCD message and can be represented by, for example, 4 bits of the LSB of the CCC.

7) Preferred DIUC: 'Preferred DIUC' indicates a downlink burst profile (an appropriate coding and modulation scheme) suitable for receiving the MBS data.

8) Short CID: 'Short CID' indicates 8 bits of the LSB of a 16 bits connection identifier (CID) with which the MBS data is transmitted. Every MBS CID can be identified with the 8 bits of the LSB since a scope of the CID to be used for MBS data transmission is limited (for example, 0xA0~0xFE).

9) HCS (Header Check Sequence): 'HCS' is a field used for checking whether the header has errors or not.

The MBS feedback header in which the MBS data feedback information is included is preferably transmitted through a contention-based uplink band. An uplink sub-frame has contention-based subchannels through which MSSs can transmit bandwidth request headers for requesting the allocation of subchannels with which the MSSs can transmit uplink data. The MSS can transmit the MBS feedback header having the MBS data feedback information through the contention-based subchannels without the necessity of requesting other uplink.

It is also considered as a method of transmitting the MBS data feedback information that the MSS includes the MBS data feedback information in a header of data which is transmitted through uplink data transmission channels which has already been allocated to the MSS for data transmission.

The BS which has received the MBS data feedback information from the MSS retransmits the MBS data blocks which the MSS has received with errors using an appropriate downlink burst profile (a coding and modulation scheme) to the MSS [S15]. Preferably, DL_MAP IEs of the general DL-MAP, not MBS MAP (MBS_MAP IE or MBS MAP message) are used as MAP information for the retransmitted MBS data bursts. The MSS receives following MBS data as described above.

The MS can notify other MSSs receiving the MBS data of the retransmitted MBS data by transmitting the MAP information for the retransmitted MBS data through the general DL-MAP, not the MBS MAP. Namely, the other MSSs which has received the MBS data successfully is made not to be influenced by the retransmitted MBS data by distinguishing the MBS data retransmitted from the BS from the MBS data scheduled by the MBS server.

Another preferred embodiment of the present invention is described in detail as follows. The following embodiment is an example of allocating dedicated uplink bands for transmitting the MBS data feedback information. Table 17 and Table 18 are examples of an UL-MAP IE included in the UL-MAP for allocating the uplink bands for transmitting the MBS feedback header. The BS may allocate the uplink bands according to MBS connection identifiers (CIDs), not MSSs and the MSS is able to transmit the MBS feedback information through the allocated uplink bands.

TABLE 17

| Syntax | Size (bits) | Notes |
| --- | --- | --- |
| MBS_Feedback_IE{ | | |
|   Extended UIUC | 4 | 0x0f |
|   Length | 4 | Length in bytes |
|   for(i=0; i<N_CID;i++){ | | N_CID can be derived from the value of the Length field. |
|     CID | 8 | CID for MBS |
|     UIUC | 4 | UIUC used for the burst |
|     Duration | 4 | Indicates the duration, in units of OFDMA slots, of the allocation |
|   } | | |
| } | | |

Each field of the MBS UL-MAP IE of Table 17 is described in detail as follows.

1) Extended UIUC: 'Extended UIUC' is a type of the UL-MAP IE. 'Extended UIUC' of '0x0f', for example, means the UL-MAP IE is the MBS data feedback information element.

2) Length: 'Length' indicates a length of the UL-MAP IE.

3) N_CID: 'N_CID' indicates a number of the MBS CIDs to which the uplink bands are allocated for transmitting the MBS data feedback information.

4) CID: 'CID' indicates the MBS connection identifier (CID).

5) UIUC: 'UIUC' indicates a burst profile (a coding and modulation scheme) of an uplink burst with which the MBS data feedback information is transmitted.

7) Duration: 'Duration' indicates a number of slots to be allocated.

Uplink bands allocated to bursts for transmission of the MBS data feedback information in the UL-MAP IE can be allocated in an accumulative form a former uplink IE through 'duration'. Alternatively, the uplink bands can be allocated by setting up a symbol offset, a subchannel offset, the number of symbols, and the number of subchannels in the UL-MAP IE.

TABLE 18

| Syntax | Size (bits) | Notes |
| --- | --- | --- |
| Feedback polling IE( ){ | | |
|   Extended UIUC | 4 | 0x0F |
|   Length | 4 | Length in bytes of following fields |
|   for( i=0; i<Num_Allocations ; i++){ | | |
|     CID | 16 | |
|     UIUC | 4 | |
|     Feedback type | 6 | 0b1001 in a case of MBS Feedback |
|     Duration | 10 | In OFDMA slots |
|     Allocation_offset | 3 | The UL feedback shall be transmitted in the frame which is 0-8 frame delay relative to the current frame |
|     Period(p) | 2 | The UL resource region is dedicated to the MSS in every 2pframe |
|     Allocation Duration(d) | 3 | The allocation is valid for 10 × 2d frame starting from the frame defined by Allocation_offset If d == 0b000, the dedicated allocation is de-allocated If d == 0b111, the dedicated resource shall be valid until the BS commands to de-allocate the dedicated allocation |
|   } | | |
|   Padding bits | Variable | To align octet boundary |
| } | | |

Each field of the feedback polling IE in Table 18 is described in detail as follows.

1) CID: 'CID' indicates the MBS connection identifier (CID) in a case of allocating uplink burst for transmitting the MBS data feedback information, otherwise 'CID' indicates a 'Basic CID' of the MSS.

2) Feedback type: 'Feedback type' indicates a type of feedback. For example, in a case of the MBS feedback, '0b1001' is set up.

3) UIUC: 'UIUC' indicates a burst profile (a coding and modulation scheme) of uplink bursts through which the MBS data feedback information is transmitted.

4) Duration: 'Duration' indicates a number of uplink slots allocated.

5) Allocation_offset, Period(p), Allocation Duration(d): 'Allocation_offset, Period(p), Allocation Duration(d)' can be omitted when 'Feedback type' indicates the MBS feedback.

Table is an example of each feedback type used in the feedback polling IE of Table 18.

TABLE 19

| Feedback Type | Feedback contents | Description |
| --- | --- | --- |
| 0b0000 | Set as described in table 296d | MIMO mode and permutation feedback |
| 0b0001 | DL average CQI (5 bits) | 5 bits CQI feedback |
| 0b0010 | Number of index, L(2 bits) + L occurrences of antenna index (2 bits) + MIMO coefficients (5 bits) | MIMO coefficients feedback |
| 0b0011 | Preferred-DIUC (4 bits) | Preferred DL channel DIUC feedback |

TABLE 19-continued

| Feedback Type | Feedback contents | Description |
|---|---|---|
| 0b0100 | UL-TX-Power (7 bits) | UL transmission power |
| 0b0101 | Preferred DIUC (4 bits) + UL-TX-Power (7 bits) + UL-headroom (6 bits) | PHY channel feedback |
| 0b0110 | Number of groups, M (2 bits) + M occurrences of 'group index (2 bits) + CQI (5 bits) | CQIs of antenna groups |
| 0b0111 | Number of bands, N (2 bits) + N occurrences of 'band index (6bits) + CQI (5 bits)' | CQIs of multiple AMC bands |
| 0b1000 | Number of feedback types, O (2 bits) + O occurrences of 'feedback type (4 bits) + feedback content (vaiable)' | Multiple types of feedback |
| 0b1001 | MBS feedback header | MBS feedback |
| 0b1011~0b1111 | Reserved | |

Figure 13:
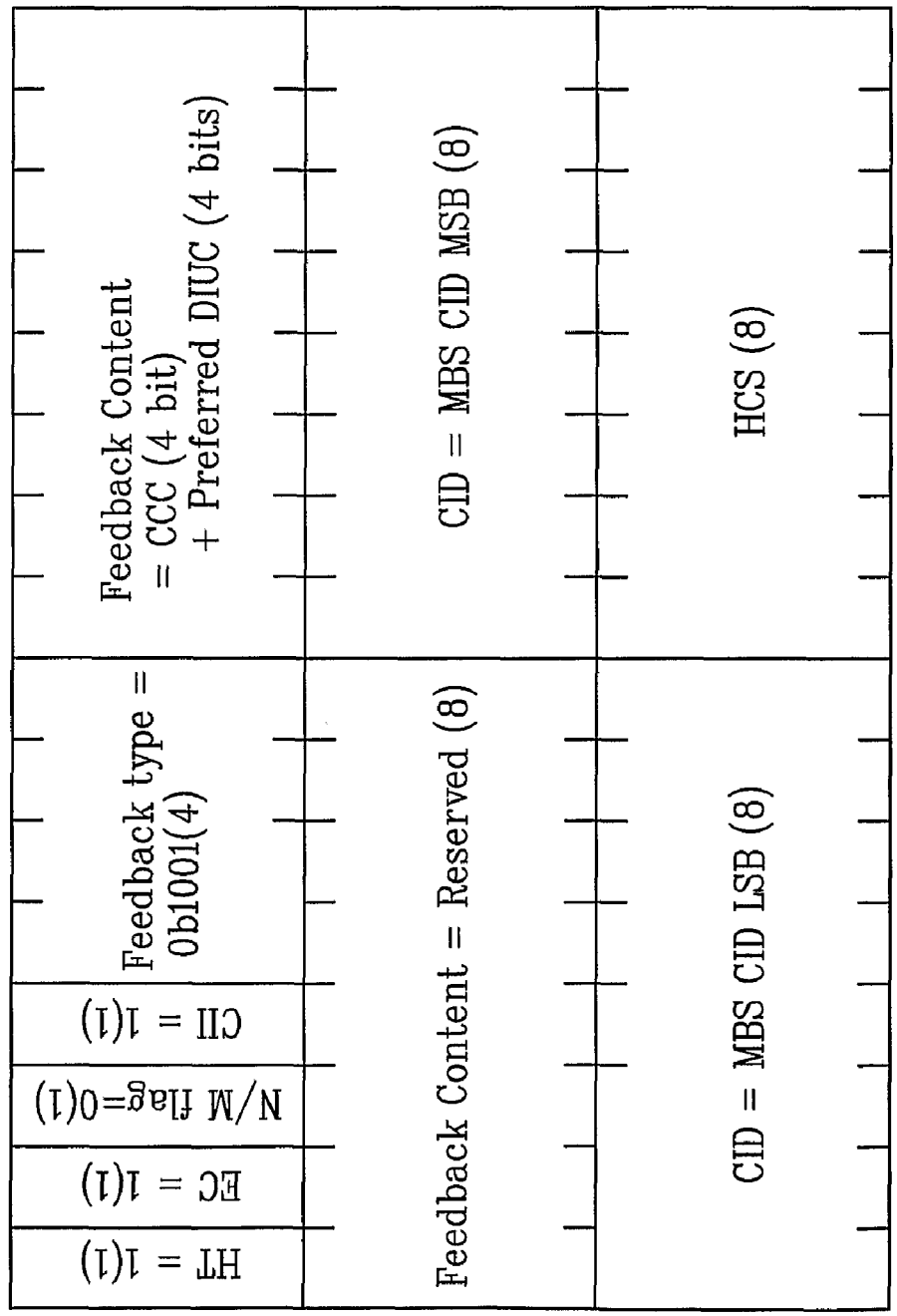
FIG. 13 is an example of a feedback header transformed from a conventional feedback header for transmitting MBS data feedback information in accordance with an embodiment of the present invention.

FIG. 13 is an example of a feedback header transformed from a conventional feedback header for transmitting the MBS data feedback information in accordance with an embodiment of the present invention. When transmitting the MBS data feedback information by the conventional feedback header, not the MBS feedback header newly defined by the present invention, through the uplink slots allocated through the feedback polling IE, the MSS makes 'Preferred DIUC' indicating a downlink burst profile (a coding and modulation scheme) suitable for receiving MBS data and a configuration change count (CCC) of a downlink channel descriptor (DCD) included in 'Feedback Content' of FIG. 13 to be transmitted. A basic CID of each MSS is included in 'CID' field in the conventional feedback header so that each MSS may transmit the feedback header. When 'Feedback type' is the MBS feedback, however, the MBS CID is included in the 'CID' field.

The BS can change downlink burst profiles of MBS data to be transmitted after receiving the feedback header based on the 'Preferred DIUC' included in the feedback header, so that may diminish reception errors of the MBS data in MSSs.

Figure 14:
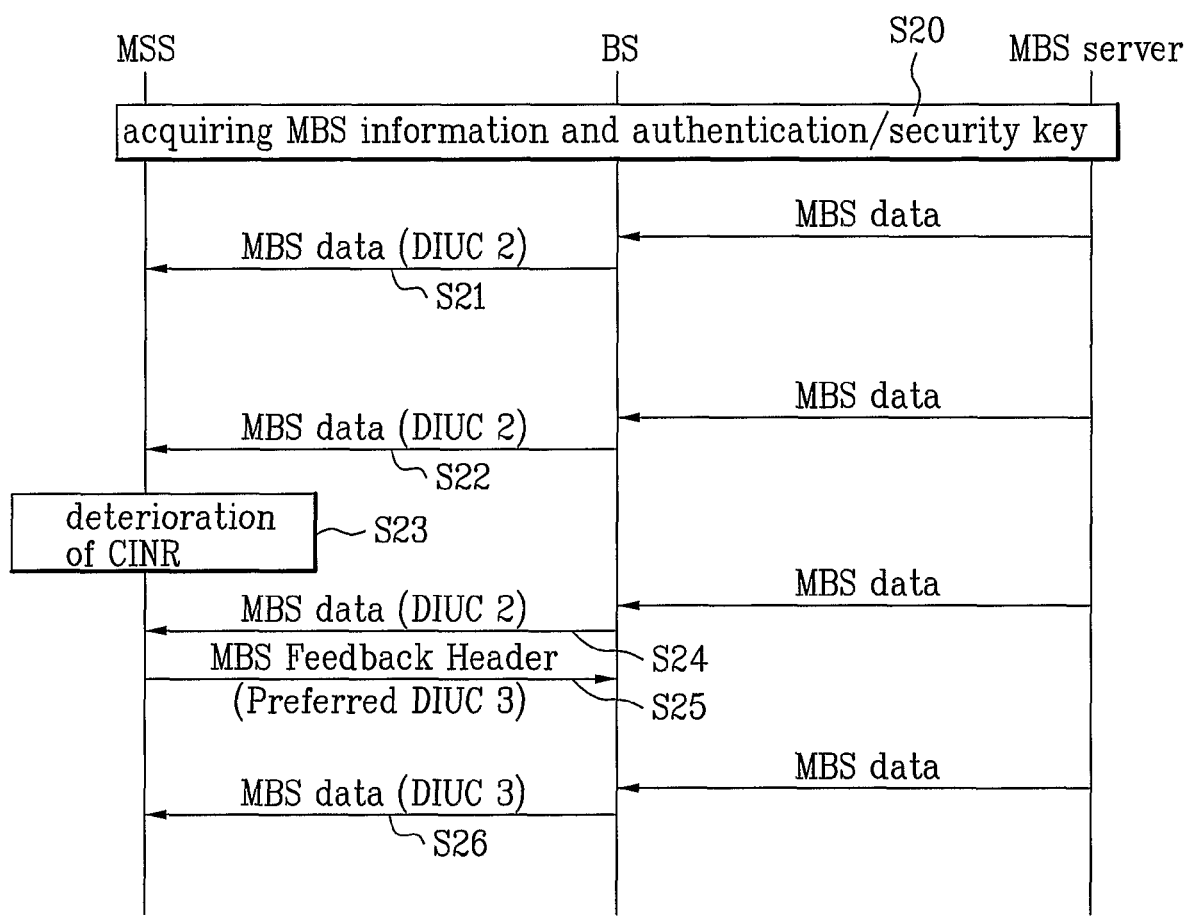
FIG. 14 illustrates a flowchart of another preferred embodiment of the present invention.

FIG. 14 illustrates a flowchart of another preferred embodiment of the present invention.

Referring FIG. 14, a mobile subscriber station (MSS) acquires information associated a multicast and broadcast service (MBS) from an MBS server and a connection identifier (CID) and authentication/encryption keys from a base station (BS) through a service generation procedure and an authentication procedure [S20].

The MBS server delivers MBS data to the BS and the BS transmits the MBS data to the MSS after informing the MSS of location information of MBS data bursts in a current frame, a coding and modulation scheme, and scheduling information of next data frames through a MBS MAP (a MBS_MAP IE or MBS MAP message, see Table 14 and 15) [S21]. The MSS receives the corresponding data bursts.

The MSS receives MBS MAPs and MBS data in following frames based on the scheduling information of the MBS data burst obtained from the MBS MAP.

The BS transmits the MBS data received from the MBS server continuously to the MSS [S22]. If the BS transmits MBS data with the prior downlink burst profile (coding and modulation scheme) when the quality of the downlink signals received from the BS is deteriorated [S23], the MSS may receive MBS data having errors [S24]. The MSS transmits MBS data feedback information to the BS [S25].

The MSS may also transmit the MBS data feedback information within which a downlink burst profile different from the prior downlink burst profile is included, although the reception errors have not occurred. The BS transmits MBS data to at least one MSS through an appropriate burst profile selected by the BS based on MBS data feedback information received from the MSS and other MSSs [S26]. In FIG. 14, downlink signal quality (e.g. CINR) is deteriorated during the MSS receives the MBS data through a burst profile of 'DIUC=2' and the MSS transmits the MBS data feedback information requesting that the BS transmit MBS data through a burst profile of 'DIUC=3' [S25]. Then, the MSS receives MBS data through the burst profile of 'DIUC=3' [S26]. The BS may preferably select a burst profile suitable for transmitting the MBS data by a pre-defined algorithm based on the MBS data feedback information received from at least one MSS.

Preferably, the MBS data feedback information may further includes identification information of the MBS data and a CID for transmitting the MBS data.

Figure 15:
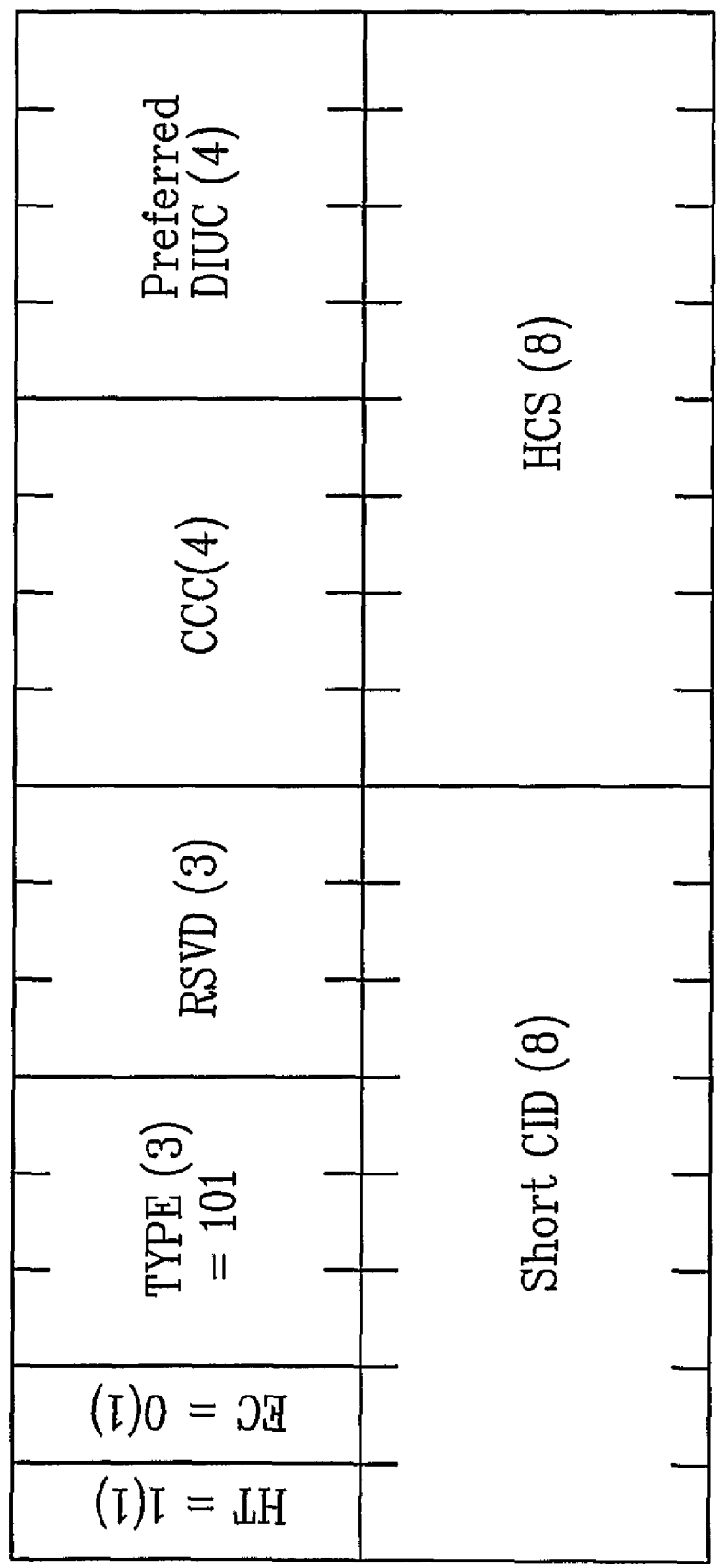
FIG. 15 illustrates an example of an MBS feedback header defined for transmitting the MBS data feedback information in accordance with a preferred embodiment of the present invention.

The MBS data feedback information may be included in a MBS feedback header or the conventional feedback header depicted in FIG. 13 to be transmitted. FIG. 15 illustrates an example of the MBS feedback header defined for transmitting the MBS data feedback information in accordance with a preferred embodiment of the present invention. Each field of the MBS feedback header in FIG. 15 is described in detail as follows.

1) HT (Header Type): 'HT' indicates a type of the MBS feedback header. For example, 'HT' of '1' indicates the header is transmitted without payload.

2) EC (Encryption Control): 'HC' indicates whether payload is encrypted or not. For example, 'HC' of '0' indicates the payload is not encrypted.

3) Type: 'Type' indicates a type of the header without the payload. A value indicating the MBS feedback header is included in 'Type'.

4) RSVD (Reserved): 'RSVD' indicates reserved bits.

5) CCC (Configuration Change Count): 'CCC' is a configuration change count of a downlink channel descriptor (DCD) message defining a burst profile associated with 'Preferred DIUC' described below. Namely, 'CCC' can be said to be an identifier of the DCD message and can be represented by, for example, 4 bits of the LSB of the CCC.

6) Preferred DIUC: 'Preferred DIUC' indicates a downlink burst profile (an appropriate coding and modulation scheme) suitable for receiving the MBS data.

7) Short CID: 'Short CID' indicates 8 bits of the LSB of a 16 bits connection identifier (CID) with which the MBS data is transmitted. Every MBS CID can be identified with the 8 bits of the LSB since a scope of the CID to be used for MBS data transmission is limited (for example, 0xA0~0xFE).

8) HCS (Header Check Sequence): 'HCS' is a field used for checking whether the header has errors.

Actions and procedures of the BS for allocating the uplink bands with which the MSS transmit the MBS data feedback information are identical to those described in the description for the prior embodiment.

When the BS allocates uplink slots for transmitting the MBS data feedback information directly, not in the form of the MBS feedback header, the MSS may transmits the downlink burst profile and the CCC directly to the BS.

Figure 16:
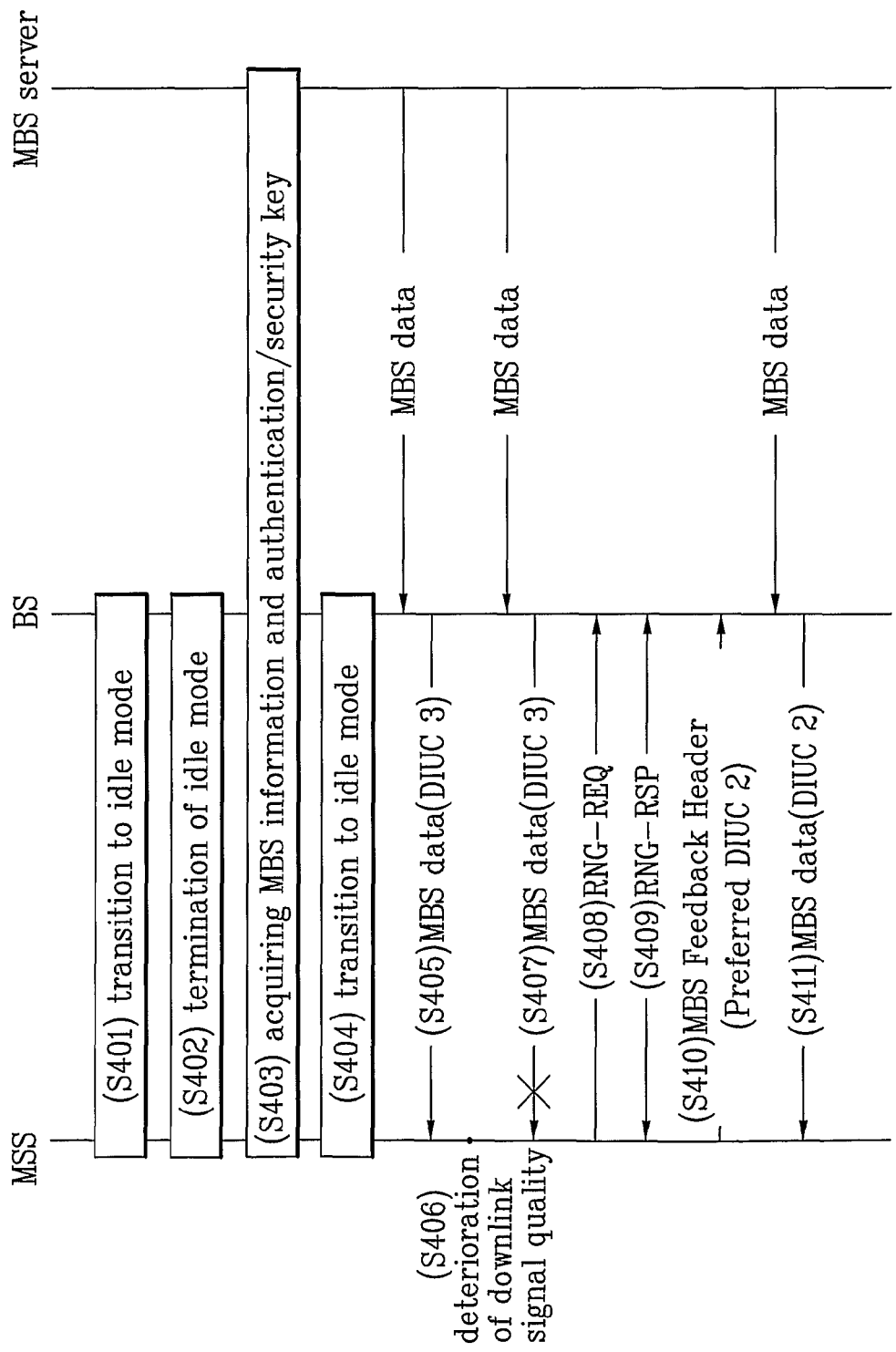
FIG. 16 illustrates a flowchart of another preferred embodiment of the present invention.

FIG. 16 illustrates a flowchart of another preferred embodiment of the present invention. The embodiment in FIG. 16 is an example of enhancing MBS data reception efficiency at an MSS in an idle mode in accordance with the present invention.

Referring FIG. 16, the MSS requests a mode shift into an idle mode by transmitting a de-registration request (DREG_REQ) message to the BS and the BS allows the MSS to go into the idle mode state by transmitting a de-registration_command (DREG_CMD) message. After the MSS goes into the idle mode [S401], the MSS receives a paging advertisement message at predetermined cycles and determines whether to maintain the idle mode, perform a location update procedure, or terminate the idle mode.

The MSS in the idle mode has to terminate the idle mode and acquire MBS-related parameters in order to receive MBS data [S402]. The MSS performs an authentication process and an MBS-related parameters acquisition process through an MBS service generation procedure between the BS and a MBS server [S403].

The MSS which has received the MBS-related parameters goes into the idle mode through 'S401' again. When an MSS in a normal mode goes into the idle mode after acquiring the MBS-related parameters, 'S401' and 'S402' may be omitted.

The MBS server delivers MBS data to the BS and the BS transmits the MBS data to the MSS after informing the MSS of location information of MBS data bursts in a current frame, a coding and modulation scheme, and scheduling information of next data frames through a MBS MAP (a MBS_MAP IE or MBS MAP message) [S405]. The MSS in the idle mode receives the corresponding MBS data bursts. Let's assume the burst profile of the MBS data received by the MSS is 'DIUC=3'.

During the MSS receives the MBS data, quality of downlink signals (e.g. CINR: Carrier to Interference and Noise Ratio) can be deteriorated so that the MSS may not receive the MBS data bursts without errors [S406]. If the BS transmits MBS data using the prior downlink burst profile (the coding and modulation scheme) in that case, errors may occur when the MSS receives the MBS data [S407]. To prevent the errors from occurring, the MSS may request the change of the downlink burst profile for transmitting the MBS data by transmitting MBS data feedback information.

The MSS in the idle mode has to adjust uplink transmission parameters first in order to transmit the MBS data feedback information to the BS. The MSS transmits a ranging request (RNG-REQ) message to the BS to adjust the uplink transmission parameters [S408]. More particularly, when an OFDMA (Orthogonal Frequency Division Multiple Access) scheme is used, the MSS transmits specific codes for the ranging, otherwise, the MSS transmits the RNG-REQ message to the BS.

The BS which has received the RNG-REQ message from the MSS includes adjustment values of the uplink transmission parameters and ranging state values in a raging response (RNG-RSP) message to be transmitted. [S409].

The MSS which has acquired uplink transmission synchronization through the ranging procedure transmits the MBS data feedback information included in an MBS feedback header to the BS [S410]. The MBS data feedback information includes information associated with a coding and modulation scheme suitable for receiving MBS data and a CID with which the MBS data is transmitted. Preferably, the MBS data feedback information further includes a CID of the MBS data and a CCC of a DCD message defining a burst profile associated with a coding and modulation scheme suitable for receiving the MBS data.

The MBS data feedback information can be transmitted through uplink slots allocated to the MSS so as to transmit the MBS feedback header only or contention-based band request slots. Alternatively, the MSS requests allocation of uplink bands for transmitting the MBS feedback header and then the MSS can transmit the MBS feedback header through the allocated uplink slots.

The BS may change the burst profile of the MBS data based on MBS data feedback information received from at least one MSS and transmit MBS data using the changed burst profile [S411]. Burst profiles for MSSs in a normal mode or a sleep mode may preferably be considered in changing the burst profile for the MBS data. The MSSs in the normal mode or sleep mode may not transmit the MBS data feedback information since the burst profiles for the MSSs are known for the BS already through burst profile management.

Figure 17:
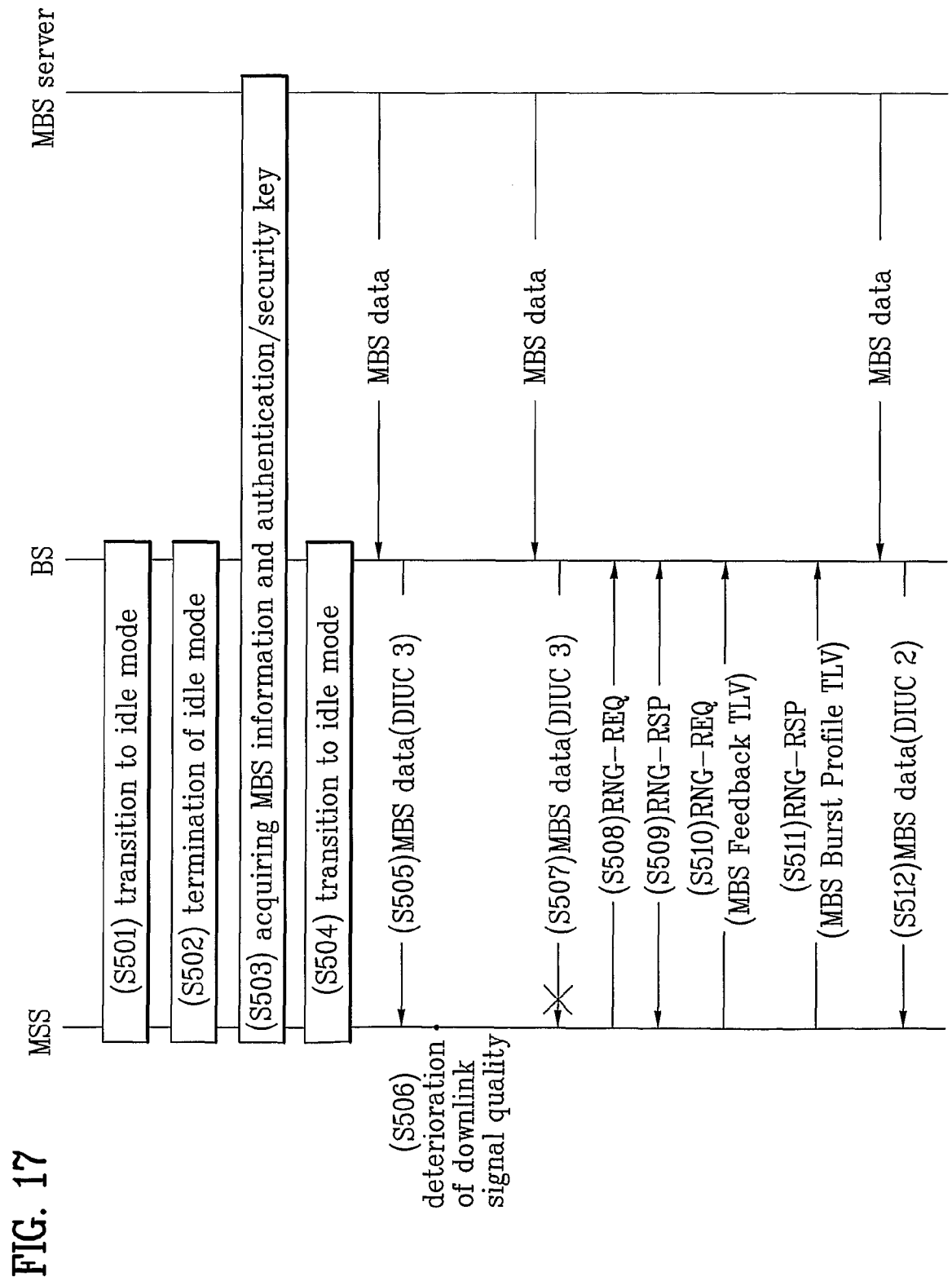
FIG. 17 illustrates a flowchart of another preferred embodiment of the present invention.

FIG. 17 illustrates another preferred embodiment in accordance with the present invention. In the example of FIG. 17, the MSS makes the MBS data feedback information included in a ranging request (RNG-REQ) message to be transmitted so that the MS may change the burst profile of the MBS data appropriately.

Description for steps of S501~S509 can be replaced by those of S401~S409 in FIG. 16 described above. Referring FIG. 17, the MSS transmits the MBS data feedback information through the RNG-REQ message for requesting the change of the downlink burst profile [S510].

The MBS data feedback information includes information associated with a coding and modulation scheme suitable for receiving MBS data and a CID with which the MBS data is transmitted. Preferably, the MBS data feedback information further includes a CID of the MBS data and a CCC of a DCD message defining a burst profile associated with a coding and modulation scheme suitable for receiving the MBS data.

Table 20 is an example of a type length value (TLV) parameter of the MBS data feedback information included in the RNG-REQ message.

TABLE 20

| Name | Type | Length | Value |
|------|------|--------|-------|
| MBS Feedback Information | TBD | 3 Byte | Preferred DIUC for MBS connection identified by MBS CID<br>Bits 3: 0 - Preferred DIUC - Preferred DIUC for MBS connection<br>Bits 7: 4 - CCC - Configuration Change Count of DCD associated to DIUC<br>Bits 23: 8 - MBS CID |

The BS which has received the RNG-REQ message within which the MBS data feedback information is included transmits burst profile information for MBS data to be transmitted through a raging response (RAN-RSP) message to the MSS [S511]. Table 21 is an example of a TLV parameter of the burst profile information included in the RAN-RSP message.

TABLE 21

| Name | Type | Length | Value |
|------|------|--------|-------|
| MBS burst profile Information | TBD | 3 Byte | This parameter is sent in response to the RNG-REQ Requested MBS Burst Profile.<br>Bits 3: 0 - DIUC - DIUC for MBS connection<br>Bits 7: 4 - CCC - Configuration Change Count of DCD associated to DIUC<br>Bits 23: 8 - MBS CID |

The BS which has received MBS data feedback information from at least one MSS including the MSS may change the MBS burst profile and transmit the MBS data using the changed MBS burst profile so that the at least one MSS may receive the MBS data without errors [S511].

The present invention has effects of enabling MSSs to increase the reception efficiency of the MBS data and ensuring quality of a multicast and broadcast service (MBS) by transmitting the MBS data using an appropriate burst profile changed by the BS based on MBS data feedback information received from at least one MSS.

According to the present invention, an MSS can transmit the MBS data feedback information by a dedicated header through contention-based uplink bands without requesting the allocation of special uplink bands to the BS, so that procedures for feedback can be simplified and uplink resources can be economized.

The above described embodiments are cases in which the technical features of the present invention are applied to a broadband wireless access system according to the IEEE 802.16 technical standard. It is apparent to those having ordinary skill in the art that the technical features of the present invention can be applicable to any wireless communications system such as a mobile communications system or a portable internet system, etc.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

INDUSTRIAL APPLICABILITY

The present invention can be applicable to all mobile or wireless communications systems supporting a point-to-multipoint service with which data is transmitted from a source to a plurality of receivers.

The invention claimed is:

1. A method of controlling data transmission for a multicast and broadcast service (MBS) in a broadband wireless access system, the method comprising:
   transmitting MBS data to at least one terminal;
   receiving MBS data feedback information including information associated with a coding and modulation scheme selected by the at least one terminal; and
   determining a coding and modulation scheme for transmitting the MBS data based on the MBS data feedback information,
   wherein the MBS data feedback information further includes MBS data identification information, an MBS data connection identifier (CID), and a configuration change count (CCC) of a downlink channel descriptor (DCD) message defining a burst profile associated with the coding and modulation scheme selected by the at least one terminal.

2. The method of claim 1, further comprising retransmitting the MBS data to the at least one terminal using the determined coding and modulation scheme.

3. The method of claim 2, further comprising:
   transmitting MAP information for the MBS data, wherein the MAP information is an MBS MAP.

4. The method of claim 3, further comprising:
   transmitting MAP information for the retransmitted MBS data, wherein the MAP information for the retransmitted MBS data is a general downlink MAP.

5. The method of claim 1, wherein the at least one terminal is in a state of an idle mode.

6. The method of claim 5, wherein the coding and modulation scheme for transmitting the MBS data is determined based on the MBS data feedback information from the at least one terminal in an idle mode and burst profiles from at least one terminal in a sleep mode or a normal mode.

7. The method of claim 1, wherein the MBS data feedback information is included in a MBS feedback header to be transmitted.

8. The method of claim 7, wherein the MBS feedback header is transmitted through a contention-based uplink band.

9. The method of claim 7, further comprising:
   allocating an uplink band for transmitting the MBS feedback header to the at least one terminal; and
   receiving the MBS feedback header through the allocated uplink band.

10. The method of claim 1, wherein the MBS data identification information is a block sequence number (BSN) of the MBS data.

11. The method of claim 1, wherein the MBS data identification information is a frame number of the MBS data.

12. A method of controlling data transmission for a multicast and broadcast service (MBS) at a terminal in a broadband wireless access system, the method comprising:
   receiving MBS data from a base station;
   determining whether to request modification of a coding and modulation scheme for transmitting the MBS data; and
   transmitting MBS data feedback information including information associated with a desired coding and modulation scheme, if the requested modification is determined to be necessary,
   wherein the MBS data feedback information further includes MBS data identification information, an MBS data connection identifier (CID), and a configuration change count (CCC) of a downlink channel descriptor (DCD) message defining a burst profile associated with the coding and modulation scheme selected by at least one terminal for receiving the MBS data.

13. The method of claim 12, wherein the modification of the coding and modulation scheme is determined to be necessary if the received MBS data has errors or the burst profile of the received MBS data is not suitable for receiving the MBS data.

14. The method of claim 12, further comprising acquiring uplink transmission synchronization for transmitting the MBS data feedback information to the base station, if the terminal is in an idle mode.

15. The method of claim 12, wherein the MBS data feedback information is included in an MBS feedback header to be transmitted.

16. The method of claim 15, wherein the MBS feedback header is transmitted through a contention-based uplink band.

17. The method of claim 15, further comprising transmitting the MBS feedback header through an uplink band allocated by the base station.

18. The method of claim 12, further comprising:
   receiving a MAP information for the MBS data, wherein the MAP information is an MBS MAP.

19. The method of claim 12, further comprising receiving the MBS data retransmitted from the base station according to a desired coding and modulation scheme.

20. The method of claim 19, further comprising:
   receiving MAP information for the retransmitted MBS data, wherein the MAP information for the retransmitted MBS data is a general downlink MAP.

21. The method of claim 12, wherein the MBS data identification information is a block sequence number (BSN) of the MBS data.

22. The method of claim 12, wherein the MBS data identification information is a frame number of the MBS data.

* * * * *